US012179346B2

(12) United States Patent
Pfister et al.

(10) Patent No.: US 12,179,346 B2
(45) Date of Patent: Dec. 31, 2024

(54) ACTIVE AND PASSIVE ARM MODULE, END MODULE AND INDUSTRIAL ROBOT

(71) Applicant: Beckhoff Automation GmbH, Verl (DE)

(72) Inventors: Michael Pfister, Hafenlohr (DE); Hans Beckhoff, Verl (DE); Dirk Janssen, Verl (DE); Uwe Prüssmeier, Lemgo (DE); Christoph Zech, Moedling (AT); Leo Büchinger, Berndorf (AT); Thomas Morscher, Vienna (AT); Armin Pehlivan, Nüziders (AT); Peter Kastler, Vienna (AT); Clemens Maier, Blundenz (AT)

(73) Assignee: Beckhoff Automation GmbH, Verl (DE)

( * ) Notice: Subject to any disclaimer, the term of this patent is extended or adjusted under 35 U.S.C. 154(b) by 294 days.

(21) Appl. No.: 17/566,879

(22) Filed: Dec. 31, 2021

(65) Prior Publication Data
US 2022/0118634 A1    Apr. 21, 2022

Related U.S. Application Data

(63) Continuation of application No. PCT/EP2020/070972, filed on Jul. 24, 2020.

(30) Foreign Application Priority Data

Jul. 25, 2019    (DE) .................... 10 2019 120 116.0

(51) Int. Cl.
*B25J 9/08*    (2006.01)
*B25J 9/00*    (2006.01)
(Continued)

(52) U.S. Cl.
CPC ......... *B25J 19/0029* (2013.01); *B25J 9/0009* (2013.01); *B25J 9/08* (2013.01);
(Continued)

(58) Field of Classification Search
CPC . B25J 9/08; B25J 9/102; B25J 19/0029; B25J 9/126
See application file for complete search history.

(56) References Cited

U.S. PATENT DOCUMENTS

| 4,319,772 A | 3/1982 | Weirich et al. |
| 4,370,091 A | 1/1983 | Gagliardi |

(Continued)

FOREIGN PATENT DOCUMENTS

| CN | 2735363 Y | 10/2005 |
| CN | 101861234 A | 10/2010 |

(Continued)

OTHER PUBLICATIONS

Translation of CN-106541398-A (Year: 2017).*
(Continued)

*Primary Examiner* — Randell J Krug
(74) *Attorney, Agent, or Firm* — Dorsey & Whitney LLP

(57) ABSTRACT

An active arm module for the robot arm of a modular industrial robot has a first housing, first and connection sides arranged at an offset, and a drive device. The first connection side is mounted rotatably relative to the first housing, and is connected to the drive device in a torque-locking manner. The second connection side is connected to the first housing in a torque-proof manner, the drive device being arranged in the first housing and configured to rotate the first connection side relative to the first housing. A further module can be connected to the first and/or second connection side, where the first connection side is optically, electrically, power-electrically and/or fluidically connected to the second con-
(Continued)

nection side, and an optical signal, electrical signal, electrical power, and/or a fluid can be exchanged with the further module via the and/or second connection side.

16 Claims, 22 Drawing Sheets

(51) Int. Cl.
  *B25J 9/10* (2006.01)
  *B25J 9/12* (2006.01)
  *B25J 9/16* (2006.01)
  *B25J 19/00* (2006.01)
(52) U.S. Cl.
  CPC .............. *B25J 9/102* (2013.01); *B25J 9/126* (2013.01); *B25J 9/161* (2013.01)

(56) References Cited

U.S. PATENT DOCUMENTS

| | | | |
|---|---|---|---|
| 4,438,309 | A | 3/1984 | Zimmer |
| 4,655,655 | A | 4/1987 | Schuerfeld |
| 4,990,839 | A | 2/1991 | Schonlau |
| 5,039,193 | A | 8/1991 | Snow et al. |
| 5,056,829 | A | 10/1991 | Kramer |
| 5,069,524 | A | 12/1991 | Watanabe et al. |
| 5,205,701 | A | 4/1993 | Kigami et al. |
| 5,488,215 | A | 1/1996 | Aronsson |
| 5,633,963 | A | 5/1997 | Rickenbach et al. |
| 5,850,762 | A | 12/1998 | Kochanneck |
| 6,084,373 | A | 7/2000 | Goldenberg et al. |
| 6,628,338 | B1 | 9/2003 | Elberbaum et al. |
| 8,786,385 | B1 | 7/2014 | Lorenc |
| 8,845,338 | B2 | 9/2014 | Sirkett et al. |
| 8,909,008 | B1 | 12/2014 | Tzeng et al. |
| 8,978,509 | B2 | 3/2015 | Pan et al. |
| 9,677,602 | B1 | 6/2017 | Baghdasarian |
| 9,751,220 | B2 | 9/2017 | Murphy et al. |
| 9,796,097 | B2 | 10/2017 | Kirihara |
| 10,281,657 | B2 | 5/2019 | Sullivan |
| 10,343,277 | B2 | 7/2019 | Gombert et al. |
| 10,780,575 | B2 | 9/2020 | Reese et al. |
| 10,821,613 | B2 | 11/2020 | Yoshimura et al. |
| 11,413,761 | B2 | 8/2022 | Simkins |
| 2001/0052735 | A1 | 12/2001 | Sakamoto |
| 2008/0118204 | A1 | 5/2008 | Ankerhold |
| 2010/0314376 | A1 | 12/2010 | Zander et al. |
| 2013/0340560 | A1 | 12/2013 | Burridge et al. |
| 2014/0245856 | A1 | 9/2014 | Kirihara et al. |
| 2014/0283642 | A1 | 9/2014 | Harada et al. |
| 2016/0046019 | A1 | 2/2016 | Ryu et al. |
| 2016/0195385 | A1 | 7/2016 | Hoeller et al. |
| 2017/0341228 | A1 | 11/2017 | Ryu et al. |
| 2018/0079080 | A1 | 3/2018 | Kozaki |
| 2018/0111275 | A1 | 4/2018 | Kurek |
| 2018/0169872 | A1 | 6/2018 | Okamoto |
| 2019/0099883 | A1 | 4/2019 | Niu |
| 2019/0168395 | A1 | 6/2019 | Hay et al. |
| 2020/0269417 | A1 | 8/2020 | Riek et al. |
| 2020/0282553 | A1* | 9/2020 | Simkins ................. B25J 9/1602 |
| 2022/0134539 | A1 | 5/2022 | Kastler et al. |
| 2022/0134540 | A1 | 5/2022 | Kastler et al. |
| 2022/0143815 | A1 | 5/2022 | Kastler et al. |

FOREIGN PATENT DOCUMENTS

| | | | |
|---|---|---|---|
| CN | 106541398 | A * | 3/2017 |
| CN | 107466262 | A | 12/2017 |
| CN | 108858135 | A | 11/2018 |
| DE | 3717597 | A1 | 1/1988 |
| DE | 29912409 | U1 | 9/1999 |
| DE | 102013019869 | A1 | 5/2015 |
| DE | 202014010032 | U1 | 3/2016 |
| DE | 202016104373 | U1 | 8/2016 |
| DE | 102017104319 | A1 | 9/2017 |
| DE | 102017001943 | A1 | 8/2018 |
| DE | 102019120128 | A1 | 1/2021 |
| DE | 102019120131 | A1 | 1/2021 |
| DE | 102019120135 | A1 | 1/2021 |
| EP | 0054454 | A1 | 6/1982 |
| EP | 0221186 | A1 | 5/1987 |
| EP | 0743143 | A1 | 11/1996 |
| EP | 0901877 | A2 | 3/1999 |
| EP | 1123784 | A2 | 8/2001 |
| EP | 3372354 | A1 | 9/2018 |
| EP | 3441205 | A2 | 2/2019 |
| EP | 3476548 | A1 | 5/2019 |
| WO | 9532078 | A1 | 11/1995 |
| WO | 9608675 | A1 | 3/1996 |
| WO | 9901261 | A1 | 1/1999 |
| WO | 9960667 | A2 | 11/1999 |
| WO | 2012136645 | A1 | 10/2012 |
| WO | 2018158097 | A1 | 9/2018 |
| WO | 2019038221 | A1 | 2/2019 |
| WO | 2019081662 | A1 | 5/2019 |
| WO | 2019081662 | A9 | 8/2019 |
| WO | 2021013912 | A1 | 1/2021 |
| WO | 2021013913 | A1 | 1/2021 |
| WO | 2021013995 | A1 | 1/2021 |

OTHER PUBLICATIONS

English translation of CN 106541398 (Zhang) from ESPACENET. (Year: 2017).*
Office Action dated Jun. 21, 2022 in connection with Chinese Patent Application No. 202080053862.4, 11 pages including English translation.
International Search Report and Written Opinion dated Jan. 13, 2021 in connection with International Patent Application No. PCT/EP2020/070972, 35 pages including English translation.
International Preliminary Report on Patentability dated Jul. 27, 2021 in connection with International Patent Application No. PCT/EP2020/070972, 38 pages including English translation.
Office Action dated Dec. 15, 2020 in connection with German patent application No. DE 10 2019 120 116.0, 18 pages including English translation.
International Search Report and Written Opinion issued in International Application No. PCT/EP2020/070974, mailed on Nov. 10, 2020, 22 pages including English Translation.
Office Action issued in German Patent Application No. 102019120128.4 issued on Apr. 6, 2020, 11 pages with English translation.
International Search Report and Written Opinion dated Jan. 13, 2021 in connection with International Patent Application No. PCT/EP2020/070755, 27 pages including English translation.
International Preliminary Report on Patentability dated Mar. 4, 2021 in connection with International Patent Application No. PCT/EP2020/070755, 32 pages including English translation.
International Preliminary Report on Patentability dated Jun. 24, 2021 in connection with International Patent Application No. PCT/EP2020/070974, 137 pages including English translation.
International Preliminary Report on Patentability dated Jul. 9, 2021 in connection with International Patent Application No. PCT/EP2020/070754, 24 pages including English translation.
International Search Report and Written Opinion dated Nov. 5, 2020 in connection with International Patent Application No. PCT/EP2020/070754, 21 pages including English translation.
"EtherCAT—the Ethernet Fieldbus," Beckhoff Automation GmbH, Nov. 2012, 21 pages.
Office Action dated Jul. 12, 2023 in connection with Chinese patent application No. 202080053383.2, 20 pages including English translation.
Office Action dated Nov. 11, 2023 in connection with Chinese patent application No. 202080053383.2, 21 pages including English translation.
Office Action dated Dec. 28, 2022 in connection with Chinese patent application No. 202080054360.3, 9 pages including English translation.

(56) References Cited

OTHER PUBLICATIONS

Office Action dated Dec. 28, 2022 in connection with Chinese patent application No. 202080053383.2, 9 pages including English translation.
Office Action dated Feb. 23, 2024 in connection with Chinese patent application No. 202080053383.2, 8 pages including English translation.
"English translation of EP1123784A2" Franz, Aug. 16, 2001), cited Jul. 31, 2024 in copending U.S. Appl. No. 17/575,010.
"English translation of EP3372354A1," (Valente, Sep. 12, 2018), cited Jul. 31, 2024 in copending U.S. Appl. No. 17/575,010.

* cited by examiner

ACTIVE AND PASSIVE ARM MODULE, END MODULE AND INDUSTRIAL ROBOT

CROSS-REFERENCE TO RELATED APPLICATIONS

This patent application is a continuation of International Patent Application PCT/EP2020/070972, filed 24 Jul. 2020, entitled ACTIVE AND PASSIVE ARM MODULE, END MODULE, ROBOTIC ARM AND INDUSTRIAL ROBOT, which claims the priority of German patent application DE 10 2019 120 116.0, filed 25 Jul. 2019, entitled AKTIVES UND PASSIVES ARMMODUL, ENDMODUL, ROBOTERARM UND INDUSTRIEROBOTER, each of which is incorporated by reference herein, in the entirety and for all purposes.

FIELD

The invention relates to an active arm module, to a passive arm module, to an end module and to an industrial robot.

BACKGROUND

The technical field of automation technology (implementation, measurement, control/regulation, communication, man/machine interface, safety, etc.) has the object of automating machines incl. industrial robots and/or systems, i.e. to be able to operate them independently and without the involvement of a human being. A degree of automation (ratio of automated production steps to all production steps) in an automation system is higher, the more independent a respective machine in a system and/or a respective system is/are from human intervention.

Goals of automation technology are a relief of humans from dangerous, strenuous and/or monotonous activities, an improvement of a quality by the technical system, a higher efficiency of the system and a cost reduction by the system. Through advances in machines, a signal detection, a signal processing and/or a communication (networking) of components within the automation system, the degree of automation of an existing or a new system may be significantly increased compared to the state of the art.

For communication, an automation system comprises suitable components that usually communicate with one another in what is referred to as a Local Area Network (LAN), which is a spatially limited network in which the various network components are coupled with one another wirelessly, optically, electrically and/or optoelectrically. The network components may be one or a plurality of servers and one or a plurality of workstations (machines), referred to as network elements or topologically: network nodes, which are interconnected, e.g. via radio links, optical waveguides, coaxial cables and/or twisted pair cables (network edges) and may communicate via these.

An automation communication network used in automation technology usually corresponds to a so-called field-bus system. A field-bus system is a bus system in which decentrally arranged components of a machine periphery, such as input modules, output modules, drives, operating terminals, etc., are connected to control units via the field-bus system. A shared transmission channel, e.g. in the form of the field bus or as a radio link, is available for data transmission. Communication between the network components within the LAN is based on network protocols.

Application-specific industrial robots (manipulators) are an integral part of such automated systems. An industrial robot is a programmable machine for handling, assembling and/or machining workpieces. The industrial robot generally includes a robot base, a robot arm (manipulator) with a plurality of proximal (toward a robot base) and distal (away from the robot base) arm links that may be pivoted and/or rotated (angle of rotation limited) relative to one another, an end effector (e.g. a robot hand, tool, gripper, etc.), a local controller/regulator, and, as the case may be, a global controller/regulator. Industrial robots are often equipped with different sensors. When programmed, the industrial robot is able to autonomously execute a workflow or to vary an execution of a task depending on information from a sensor.

For example, U.S. Publication No. 2018/0111275 A1 discloses a modular robot arm. The modular robot arm has a set of modular robot components that are interconnected. In order to connect the modular robot components to one another, a ring section is provided in each case. In this embodiment, high forces act on the connection between the two robot components.

SUMMARY

The present invention provides an improved active arm, an improved passive arm module, an improved end module and an improved an industrial robot.

According to a first aspect, an active arm module for a robot arm of a modular industrial robot comprises a first housing, a first connection side, a second connection side arranged at an offset with regard to the first connection side, and a drive device, wherein the first connection side is rotatably mounted about an axis of rotation relative to the first housing and is connected to the drive device in a torque-locking manner, wherein the second connection side is connected to the first housing in a torque-proof manner, The drive device is arranged in the first housing and is configured to controllably rotate the first connection side relative to the first housing about the axis of rotation, wherein a further module of the robot arm may be connected to the first and/or the second connection side, wherein the first connection side is optically and/or electrically and/or power-electrically and/or fluidically connected to the second connection side and an optical signal and/or an electrical signal and/or an electrical power and/or a fluid may be exchanged with the further module via the first connection side and/or via the second connection side.

According to a second aspect, an active arm module for a robot arm of a modular industrial robot comprises a first housing, a first connection side, a second connection side arranged at an offset with regard to the first connection side, and a drive device, wherein the first connection side is rotatably mounted about an axis of rotation relative to the first housing and connected to the drive device in a torque-locking manner. The second connection side is connected to the first housing in a torque-proof manner and oriented relative to a connection axis which is aligned perpendicular to the axis of rotation and running in a rotational plane of the rotational axis, wherein the drive device is arranged in the first housing and is configured to controllably rotate the first connection side relative to the first housing about the axis of rotation.

A further module of the robot arm may be connected to the first and/or the second connection side, wherein the first housing is adapted for fluidic, electrical and data-based connection of the first connection side to the second connection side which optically and/or electrically and/or power-electrically and/or fluidically connect the first connection side to the second connection side, so that an optical signal and/or an electrical signal and/or an electrical power and/or a fluid may be exchanged with the further module via the first connection side and/or via the second connection side.

The drive device is arranged adjacent to the first connection side in the axial direction, wherein the drive device comprises a stator and a rotor, wherein the rotor is torque-locked with the first connection side and supported about the rotational axis in a rotatable manner, wherein the stator is circumferentially connected to the first housing in a torque-proof manner. The drive device comprises a gear device which, relative to the rotational axis, is axially arranged between the rotor and the first connection side and at least comprises a first input side and an output side. The first input side is connected to the rotor and the output side is connected to the first connection side, each in a torque-proof manner, wherein the gear device is embodied to reduce an input speed on the first input side to an output speed on the output side.

The drive device comprises a first hollow shaft, a second hollow shaft, and a bearing assembly, wherein the first hollow shaft and the second hollow shaft are rotatably supported about the axis of rotation by the bearing assembly, wherein the first hollow shaft receives the second hollow shaft and the bearing arrangement rotatably supports the first hollow shaft relative to the second hollow shaft. The first hollow shaft connects the rotor to the first input side of the gear device in a torque-proof manner, wherein the second hollow shaft connects the output side of the gear device to the first connection side.

A transfer device is in axial direction arranged on a side facing away from the first connection side, comprising an encoder connected to the first housing in a torque-proof manner and comprising a transfer rotor rotatably supported around the rotational axis, wherein the encoder and the transfer rotor are coupled to each other electrically and fluidically, The second hollow shaft is axially longer than the first hollow shaft and reaches through the transfer device, wherein the transfer rotor is connected to the first connection side in a torque-proof manner by the second hollow shaft. The transfer rotor is electrically connected to a first power contact device of the first connection side by the second hollow shaft and fluidically connected to a first fluid contact device of the first connection side via a fluid channel. The encoder is electrically connected to a second power contact device of the second connection side and fluidically connected to a second fluid contact device of the second connection side.

According to a third aspect, an end module for a modular robot arm of a modular industrial robot comprises an end connection side and an end housing, wherein the end connection side is connected to the end housing in a torque-proof manner, wherein the end connection side is embodied to correspond to a first connection side of an active arm module or to a second connection side of the active arm module of the robot arm and is connectable to the first connection side or the second connection side, and/or wherein the end connection side is embodied to correspond to a third and/or fourth connection side of a passive arm module and/or is connectable to the third and/or fourth connection side. At least one of an electrical and/or optical signal and/or fluid and/or electrical power is interchangeable with the passive arm module and/or the active arm module across the end connection side.

EXAMPLES

An active arm module which can be manufactured particularly easily and in large-scale production for a modular robot arm may be provided in that the active arm module has a first housing, a first connection side, a second connection side arranged at an offset with regard to the first connection side, and a drive device. The first connection side is mounted rotatably about an axis of rotation relative to the first housing and is connected to the drive device in a torque-locking manner, the second connection side being connected to the first housing in a torque-proof manner. The drive device is arranged in the first housing and is embodied to rotate the first connection side controllably about the axis of rotation relative to the first housing. A further module may be connected to the first and/or the second connection side, wherein the first connection side is optically and/or electrically and/or power-electrically and/or fluidically connected to the second connection side, and an optical signal and/or an electrical signal and/or electrical power and/or a fluid may be exchanged with the further module via the first connection side and/or via the second connection side.

This embodiment has the advantage that fluid and/or electrical power and/or the optical and/or electrical signal are guided on the inside of the active arm module and thus the active arm module may be manufactured particularly quickly and automatically in large series. As a result, the active arm module may be manufactured particularly cost-effectively. The active arm module can form a modular system in conjunction with other arm modules. By combining at least two arm modules from the modular system and assembling them to one another, a robot arm may be formed.

By guiding the fluid and/or the electrical power and/or the optical and/or electrical signal on the inside of the active arm module, no further fluid line and/or data line and/or power cable is arranged on the outside of the active arm module, and unintentional damage to the active arm module, for example by getting caught and/or snagged on the fluid line and/or data line and/or power line, may be reliably avoided. This also means that the active arm module may be mounted to another active arm module particularly quickly and easily to form a modular robot arm.

In a further embodiment, the active arm module comprises a first control device arranged in the first housing for controlling the drive device, the first connection side having at least one first contact device and the second connection side having a second contact device for data transmission, the first contact device being connected to the second contact device in terms of data for transmitting the electrical signal and/or the optical signal, the first control device being connected to the first contact device and/or the second contact device in terms of data, the first control device being embodied to control the drive device on the basis of the optical and/or electrical signal. Preferably, the first contact device and the second contact device are embodied to correspond to one another and/or are arranged on the first and second connection sides.

By integrating the first control device into the active arm module, it is possible to dispense with further control devices for controlling the active arm module, which are e.g. housed, in a switch cabinet set up separately from the robot arm.

In a further embodiment, the first connection side comprises a first fluid contact device and the second connection side comprises a second fluid contact device, wherein the first fluid contact device is fluidically connected to the second contact device. Fluid may be transmitted by the first fluid contact device and the second fluid contact device. Preferably, the first fluid contact device and the second fluid contact device are formed to correspond to each other and/or are arranged on the first and second connection sides. This ensures fluid transfer between the active arm modules to the end effector.

In a further embodiment, the first connection side comprises a first power contact device and a connection plate, and the second connection side comprises a second power contact device, wherein the first power contact device and/or the second power contact device may be connected to an electrical power source for supplying power to the drive device, wherein the connection plate is embodied for mechanical fastening of the further module (e.g. a further active arm module or the passive arm module and/or the end module) and extends at least in sections in a radial plane to the axis of rotation, wherein the connection plate is rotatably mounted about the axis of rotation and the first power contact device is mechanically fastened to the connection plate, wherein the first power contact device is electrically connected to the second power contact device for transmitting electrical power. Preferably, the first power contact device and the second power contact device are formed to correspond to each other and/or are arranged on the first and second connection sides. By transmitting power within the active arm module, (almost ideally) unlimited rotatability of the first connection side may be ensured. Furthermore, a good mounting option may be provided by the connection plate.

In a further embodiment, the first control device is electrically connected to the first power contact device and/or the second power contact device on the input side and to the drive device on the output side. The power supply to the drive device may thus be provided from the electrical power transmitted between the first and second connection sides, so that no additional power supply is required. This further reduces the complexity of the active arm module.

In a further embodiment, the active arm module has a transfer device arranged in the first housing, preferably axially on a side of the drive device facing away from the first connection side, the transfer device having an encoder connected to the first housing in a torque-proof manner and a transfer rotor mounted rotatably about the axis of rotation, wherein the transfer rotor is connected to the first connection in a torque-proof manner side mechanically and electrically to the first power contact device, wherein the transfer rotor is electrically connected to the encoder, wherein the second power contact device is electrically connected to the encoder. This ensures substantially unrestricted rotatability of the first connection side.

In a further embodiment, the active arm module comprises a sensor device, the sensor device having at least one sensor and a signal element connected to the first connection side in a torque-proof manner, and the sensor being embodied to detect the signal element and to provide a position signal depending on a detected position of the signal element, the sensor device being arranged axially on a side of the drive device facing away from the first connection side. As a result, an orientation of the first connection side relative to the housing may be determined in a particularly precise manner, so that the first connection side may be controlled in a particularly precise manner. Furthermore, the active arm module has a particularly compact design.

A particularly stiff active arm module may be provided by the first housing having a tube-shape at least in sections, wherein the first housing preferably tapers from the second connection side towards the first connection side. The tapered embodiment may provide a possible connection between two arm modules of different sizes.

In a further embodiment, the first connection side and the second connection side are each arranged in radial planes offset from one another in the axial direction relative to the axis of rotation. This embodiment is particularly suitable for an I-shaped design of the active arm module.

Advantageously, the second connection side is arranged inclined or running parallel to the axis of rotation. In addition or as an alternative, the first housing is T-shaped or I-shaped or J-shaped or L-shaped, with the first connection side being arranged at one end of the first housing and the second connection side being arranged at another end of the first housing.

In a further embodiment, the drive device is arranged in the axial direction adjacent to the first connection side, the drive device comprising a stator and a rotor, the rotor being connected to the first connection side in a torque-locking manner and being mounted rotatably around the axis of rotation, the stator being surrounded circumferentially by the first housing and being connected to the first housing in a torque-proof manner. As a result, the forces acting on the drive device may be kept low, so that the drive device may be embodied to be particularly compact and light. Furthermore, increased wear is prevented.

In a further embodiment, the drive device has a gearbox, the gearbox being arranged axially with respect to the axis of rotation between the rotor and the first connection side, the gearbox having at least a first input side and an output side, the first input side being connected to the rotor and the output side being connected to the first connection side in a torque-locking manner in each case, the gearbox being embodied to reduce an input speed from the first input side to an output speed at the output side. With the gearbox, a particularly high torque may be provided by a compact drive motor at the first connection side in order to rotate the first connection side. As a result, the drive motor may be embodied to be particularly compact, so that the active arm module is embodied to be particularly compact in the axial direction with respect to the axis of rotation, as well.

In a further embodiment, the drive device has a first hollow shaft, a second hollow shaft and a bearing arrangement, the first hollow shaft and the second hollow shaft being rotatably mounted around the axis of rotation by the bearing arrangement, the first hollow shaft receiving the second hollow shaft and the bearing arrangement rotatably mounting the first hollow shaft with respect to the second hollow shaft, the first hollow shaft connecting the rotor to the first input side of the transmission in a torque-proof manner, the second hollow shaft connecting the output side of the transmission to the first connection side. The two hollow shafts allow for a particularly high torque to be transmitted with a low weight of the drive unit.

In a further embodiment, the gear device has a second input side, wherein the second input side is connected to the first housing in a torque-proof manner, and/or wherein the gear device has at least one planetary gear and/or one eccentric gear, in particular a cycloidal gear and/or a strain wave gear (also known as harmonic drive gear). These types of gears are particularly suitable for providing a particularly high transmission ratio in one stage. This makes twisting of the output side relative to the first and/or the second input side very difficult.

With a passive arm module for combination with an active arm module as described above, a modular robot arm of a modular industrial robot may be produced in a particularly simple manner, wherein the passive arm module comprises a second housing extending along a longitudinal axis, a third connection side arranged on the front side of the second housing and a fourth connection side arranged offset with respect to the third connection side, wherein the second housing mechanically connects the third connection side to the fourth connection side, wherein a first or second connection side of the active arm module described above may be connected to the third connection side and/or to the fourth connection side, wherein an optical signal and/or an electrical signal and/or electrical power and/or fluid may be exchanged with the active arm module via the third connection side and/or via the fourth connection side, and the third connection side is optically and/or electrically and/or power-electrically and/or fluidically connected to the fourth connection side.

This embodiment has the advantage that the fluid and/or the electrical power and/or the optical and/or electrical signal are guided on the inside of the passive arm module and the passive arm module may thus be manufactured automatically in large series. As a result, the passive arm module may be provided for the modular system of the modular robot at particularly low cost.

Furthermore, the passive arm module may extend the active arm module in its working space. It also allows the passive arm module to be mounted to the active arm module described above particularly quickly and easily to form the modular robot arm.

In a further embodiment, the third connection side and the fourth connection side are each arranged perpendicularly with regard to the longitudinal axis, wherein the second housing has a hollow embodiment and wherein at least one electrical line and/or a light guide and/or a fluid line is arranged on the inside in the second housing for connecting the third connection side to the fourth connection side. By guiding fluid and/or electrical power and/or the optical and/or electrical signal on the inside, no fluid line and/or data line and/or power cable is arranged on the outside of the passive arm module, and unintentional damage to the passive arm module, e.g. by getting caught and/or snagged on the fluid line and/or data line and/or power cable, may be reliably prevented.

In a further embodiment, the passive arm module comprises a control unit with a second control device, a data memory connected to the second control device, and an interface connected to the second control device, the interface being connected to the third connection side and/or the fourth connection side at least in terms of data, wherein a predefined control program, in particular a computer-implemented algorithm, is stored in the data memory, wherein the second control device is embodied to determine a control signal on the basis of the predefined control program and to provide it via the interface on the third connection side and/or on the fourth connection side. As a result, the control device may be used to control the modular robot arm, in particular if this is embodied as an industrial PC, for example. This means that an additional industrial PC and/or switch cabinet may be dispensed with.

In a further embodiment, the third connection side and the fourth connection side are embodied to correspond to each other, and the first connection side of the active arm module of the robot arm may be connected to the third connection side, and the second connection side of the active arm module may be connected to the fourth connection side.

Alternatively, the third connection side and the fourth connection side are embodied identically to each other, wherein the first connection side of the active arm module of the robot arm may be connected to the third connection side and the first connection side of a further active arm module may be connected to the fourth connection side.

Alternatively, the third connection side and the fourth connection side are identical to each other, wherein the second connection side of the active arm module of the robot arm may be connected to the third connection side and the second connection side of a further active arm module may be connected to the fourth connection side. These embodiments of the passive arm module of the modular system are advantageously suitable for combining several active arm modules as desired to form the modular robot arm.

It has been found that an end module that may be manufactured particularly easily and in large-scale production for a modular robot arm may be provided by the end module having an end connection side and an end housing, the end connection side being connected to the end housing in a torque-proof manner, wherein the end connection side is formed to correspond to a first connection side of an active arm module or to a second connection side of the active arm module of the robot arm and is connectable to the first connection side or the second connection side, and/or wherein the end connection side is formed to correspond to a third and/or fourth connection side of a passive arm module and/or is connectable to the third and/or fourth connection side, wherein at least one electrical and/or optical signal and/or fluid and/or electrical power may be exchanged with the passive arm module and/or the active arm module via the end connection side.

The advantage of this embodiment is that the end module of the modular system may be used to provide a simple way of supplying additional power or to supply additional components arranged on the modular robot arm, e.g. peripheral devices. Furthermore, the end module may be mounted particularly quickly and easily on the active or passive arm module for the modular robot arm and may also be manufactured in large-scale production.

In a further embodiment, the end module comprises at least one third contact device arranged at an offset with regard to the end connection side, the third contact device being fastened to the end housing, the third contact device being connected to the end connection side in terms of data and the electrical and/or optical signal being exchangeable with the end connection side via the third contact device.

In a further embodiment, the end module comprises an input unit and/or an output unit, in particular a touch-sensitive screen, which is arranged at an offset with regard to the end connection side and is attached to the end housing, the input unit and/or the output unit, in particular the touch-sensitive screen, being connected to the end connection side and being embodied to detect and/or generate the electrical and/or optical signal and to exchange the electrical and/or optical signal with the end connection side. In this way, signals may be output for a user by the end module, or manual control of the modular robot arm may be carried out by the input unit, e.g. when programming the robot arm.

In a further embodiment, the end module comprises at least one third power contact device arranged at an offset with regard to the end connection side, the third power contact device being attached to the end housing, the third power contact device being electrically connected to the end connection side and electrical power being exchangeable with the end connection side across the third power contact device. With such an end module, either electrical power may be supplied to the modular robot arm or e.g. electrical power may be supplied to the end effector and/or the peripheral device.

In a further embodiment, the end module comprises a fourth fluid contact device arranged at an offset with regard to the end connection side, the fourth fluid contact device being fastened to the end housing, the fourth fluid contact device being fluidically connected to the end connection side and the fluid, in particular a hydraulic fluid or compressed air, being exchangeable with the end connection side across the fourth fluid contact device.

A robot arm for an industrial robot may be adapted to the application scenario in a particularly simple and flexible manner if the robot arm is of modular design and has at least a first active arm module and a second active arm module, the first and/or second active arm module being embodied as described above. The first connection side of the second active arm module is mechanically connected to the second connection side of the first active arm module, and the drive device of the second active arm module is configured to rotate the second active arm module or the first active arm module about the axis of rotation, wherein the first connection side of the second active arm module is fluidically and/or electrically and/or optically coupled to the second connection side of the first active arm module in such a way that the optical signal and/or the electrical signal and/or the electrical power and/or the fluid may be exchanged with the further arm module via the first connection side of the second active arm module and via the second connection side of the first active arm module.

This embodiment has the advantage that by mounting the first arm module and the second arm module on the connection sides, a fluidic and/or electrical and/or optical coupling is also made in addition to the mechanical connection, which means that no further connections need to be made, so that the two active arm modules may be assembled to form the modular robot particularly quickly and cost-effectively. Furthermore, by selecting the different active arm modules and aligning them with each other, the modular robot arm may easily and individually be adapted to the application without further effort. Furthermore, if one of the active arm modules is defective, the modular robot may be repaired in a simple manner by replacing only the defective active arm module. This means that the repair time and thus the downtime of the modular robot arm is particularly short.

By combining at least two arm modules, different kinematic chains for forming the robot arm may be formed depending on the embodiment and combination. The arm modules may be easily combined with one another in both serial and parallel arrangements.

It is of particular advantage here if the modular robot arm additionally has a passive arm module as described above, the passive arm module being connected to the first and/or second active arm module. This allows the modular robot to be adapted to the application at low cost.

In a further embodiment, the modular robot arm comprises the end module described above, wherein the end connection side is connected to the second connection side of the first active arm module, wherein via the second connection side of the first active arm module and across the end connection side, the optical signal and/or the electrical signal and/or the electrical power and/or the fluid may be exchanged between the end module and the first active arm module. Thus, the optical signal and/or the electrical signal and/or the electrical power may be fed in or out via the end connection side.

In another embodiment, the modular robotic arm comprises an end effector, the end effector being coupled to the second active arm module on a side opposite to the first active arm module, wherein across the second active arm module, the optical signal and/or the electrical signal and/or the electrical power and/or the fluid may be exchanged between the end effector and the first active arm module.

It is of particular advantage if an industrial robot comprises a robot base and a robot arm described above, wherein the first active arm module of the robot arm is connected to the robot base, preferably wherein the robot base is adapted to exchange a fluid and/or an optical and/or electrical signal and/or electrical power with the first active arm module.

BRIEF DESCRIPTION OF THE DRAWINGS

The invention will be explained in more detail below with reference to figures, in which, in each case in a schematic illustration.

DETAILED DESCRIPTION

Figure 1:
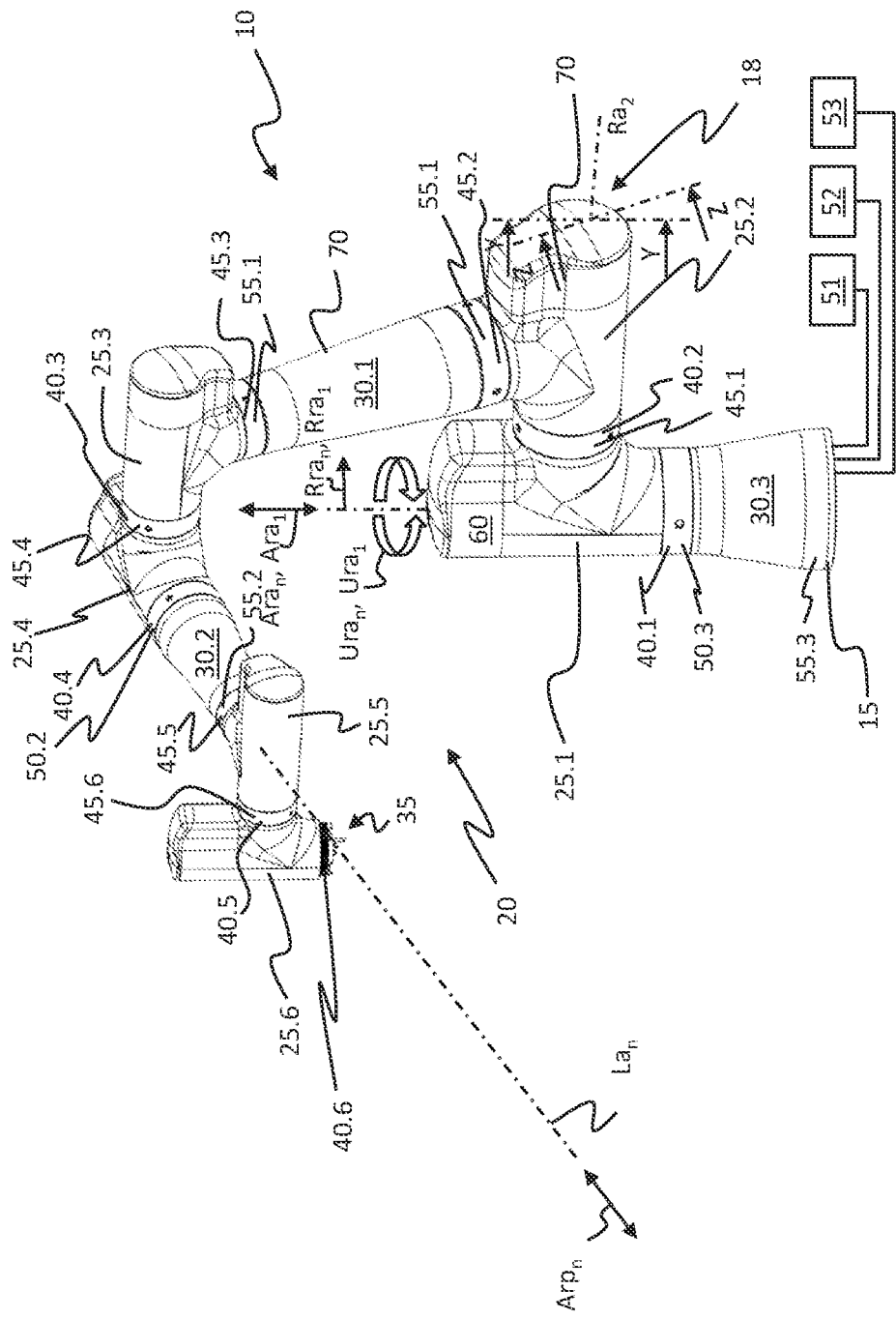
FIG. 1 shows a perspective view of an industrial robot according to a first embodiment for an automation system.

FIG. 1 shows a perspective view of an industrial robot 10 for an automation system.

The industrial robot 10 is an (automatic) machine with several degrees of freedom (FIG. 1 exemplarily shows six rotational degrees of freedom) for the field of automation, wherein the industrial robot may perform various functions in a working environment (conditionally) autonomously via a pre-programmed control/regulation. The industrial robot 10 comprises a robot base 15, a robot arm 20 and a, preferably exchangeable, end effector, also referred to as a robot hand, e.g. comprising a tool, a gripper, etc., which is arranged at a free end of the robot arm 20.

In particular, the present robot arm 20 of the industrial robot 10 is particularly embodied as a module having a plurality of arm modules 18. The arm module 18 may e.g. be an active arm module 25, a passive arm module 30, an end module, or an end. The modular system may further comprise other (arm and/or end) modules. In principle, the structure of the robot arm 20 with active arm modules 25, passive arm modules 30, end modules and/or end effector may be chosen as desired and is limited only with respect to a maximum load-bearing capacity of the arm modules 18.

In FIG. 1, the active arm modules 25 are numbered, with numbering from the robot base 15 toward the end effector. The passive arm modules 30, as well, are numbered to help distinguish them. For example, a third passive arm module 30.3 is connected to the robot base 15 at one end and to a first active arm module 25.1 at another end. At its second end, the first active arm module 25.1 is connected to a second active arm module 25.2. A first passive arm module 30.1 is arranged between the second active arm module 25.2 and a third active arm module 25.3. The third active arm module 25.3 is connected. on a side facing away from the first passive arm module 30.1, to a fourth active arm module 25.4, which is connected to a second passive arm module 30.2 on a side facing away from the third active arm module 25.3. The second passive arm module 30.2 is connected to a fifth active arm module 25.5. A sixth active arm module 25.6 is arranged on the side facing away from the second passive arm module 30.2, the end effector being arranged at the sixth active arm module 25.6 on a first connection side 40.6 facing away from the fifth active arm module 25.5. The first connection side 40.6 of the sixth active arm module 25.6 thus forms an end effector connection side 35 to which the end effector may be connected.

The active arm modules 25 each have a drive device by which a further active arm module 25 connectable thereto or a passive arm module 30 may be rotated about an associated axis of rotation $Ra_n$ of the active arm module 25.

Similarly, the passive arm modules 30 do without the drive device. They are thus embodied as a kind of extension part.

Depending on a number of active arm modules 25, the robot arm 20 also comprises a corresponding number of rotation axes $Ra_n$. That is, preferably any number of complete rotations of a respective active arm module 25 of the robot arm 20 may be performed in preferably both circumferential directions $Ura_n$ of a respective rotational axis $Ra_n$.

Furthermore, the explanation in the following refers to a polar coordinate system of a respective active arm module 25. The polar coordinate system in each case comprises a rotational axis $Ra_n$ referring in general and not to a specific active arm module 25. An axial direction $Ara_n$ of the active arm module 25 runs along the rotational axis $Ra_n$. A radial direction $Rra_n$ of the respective active arm module 25 runs perpendicularly outwards with respect to the respective rotational axis $Ra_n$. A circumferential direction $Ura_n$ of the respective active arm module 25 runs on a (circular) path around the rotational axis $Ra_n$ of the active arm module 25.

The general nomenclature is used to explain the structure of the active arm module 25 in general.

Specifically, in FIG. 1, the rotational axes $Ra_n$, the axial directions $Ara_n$ and the circumferential directions $Ura_n$ of the respective active arm module 25 are designated according to their numbering. For example, a first rotational axis $Ra_1$ of the first active arm module 25.1 bears the index 1 as the index at the position of n. A second $Ra_2$ of the second active arm module 25.2 is labeled accordingly in FIG. 1. Similarly, the axial directions $Ara_n$, the radial directions $Rra_n$ and the circumferential directions $Ura_n$ of the active arm modules 25 are labeled accordingly. In FIG. 1, only all directional indications (the first rotational axis $Ra_1$, the first axial direction $Ara_1$ and the first circumferential direction $Ura_1$) for the first active arm module 25.1 are drawn for reasons of clarity.

Furthermore, the explanation below refers to a further polar coordinate system of a respective passive arm module 30. The further polar coordinate system has a respective longitudinal axis Lan. An axial direction $Arp_n$ of the respective passive arm module 30 runs along the longitudinal axis Lan.

A respective rotational axis $Ra_n$ of the active arm module 25 is preferably associated with a force and/or torque sensor as well as, if applicable, a first and/or second sensor device of a respective active arm module 25, by which a force and/or a torque on the active arm module 25 as well as a position of the active arm module 25 relative to the rotational axis $Ra_n$ may be detected. The axis of rotation $Ra_n$ is exemplarily embodied as an ideal "joint" (rotational joint, pivot joint and/or swivel joint) of the multi-unit or preferably modularly embodied robot arm 20, e.g. with respect to the robot base 15.

A force-, torque and/or position sensor for one of the forces and/or torques occurring on the robot arm 20 and/or a relative position of the arm modules 18 with respect to each other may be provided for the respective rotational axis $Ra_n$. This may also be limited to a section of the robot arm 20.

A certain modular system for a robot arm 20 has at least one type of active arm module 25, e.g. of I-, J-, L- or T-shaped design, and preferably at least one type of passive arm module 30, for example of I-, J-, L- or T-shaped design. In FIG. 1, e.g. the active arm modules 25 are e.g. J-shaped or L-shaped, while the passive arm modules 30 are e.g. I-shaped.

In FIG. 1, all arm modules 18 of the modular system for robot arms 20 are preferably embodied in such a way that each of the arm modules 18 has at least two first, second, third and/or fourth connection sides 40, 45, 50, 55. The first to fourth connection sides 40, 45, 50, 55 of the arm modules 18 may correspond to and be connected to one another. In this regard, by way of example, each active arm module 25 has a first connection side 40 and a second connection side 45. Each passive arm module 30 has a third connection side 50 and a fourth connection side 55. However, it is also possible for each active arm module 25 to have two first connection sides 40 or two second connection sides 45. Similarly, it is also possible for each passive arm module 30 to have two third connection sides 50 or two fourth connection sides 55.

For clear identification of the respective first to fourth connection sides 40, 45, 50, 55, the assignment of the first to fourth connection sides 40, 45, 50, 55 corresponds to the numbering of the active arm modules 25 or of the passive arm modules 30. Thus, the first connection side of the first active arm module 25.1 is referred to by reference numeral 40.1 in FIG. 1.

The first connection side 40, the second connection side 45, the third connection sides 50 and the fourth connection sides 55 are embodied to correspond to one another. That is, a second connection side 45 of another active arm module 25 or a third connection side 50 of a passive arm module 30 would be connectable to each first connection side 40 of an active arm module 25. Similarly, a first connection side 40 of another active arm module 25 or a fourth connection side 55 of a passive arm module 30 would be connectable to each second connection side 45 of an active arm module 25.

In FIG. 1, the fourth connection side 55.3 of the third passive arm module 30.3 is connected to the robot base 15 as an example. In addition to the mechanical connection of the fourth connection side 55.3 of the third passive arm module 30.3 for supporting forces and torques from the robot arm 20 at the robot base 15, the robot arm 20 is supplied with a (pressurized) fluid 51 via the fourth connection side 55.3 of the third passive arm module 30.3.3, in particular with compressed air or a pressurized hydraulic fluid, e.g. a cooling fluid for cooling a material removal operation, which is introduced into the robot arm 20 via the fourth connection side 55.3 of the third passive arm module 30.3. However, the fluid 51 may flow in the opposite direction from the end connection side 35 toward the robot base 15. For example, the fluid 51 may serve as an extract, such as of particles or fluids in a clean room or explosion-proof area.

Furthermore, via the fourth connection side 55.3 of the third passive arm module 30.3, the robot arm 20 is in terms of power electrically connected to an electrical power source 52 and in terms of data connected to a data network 53.

A second connection side 45.1 of the first active arm module 25.1 is connected to a first connection side 40.2 of the second active arm module 25.2. The first passive arm module 30.1 is arranged between a second connection side 45.2 of the second active arm module 25.2 and a second connection side 45.3 of the third active arm module 25.3, wherein a fourth connection side 55.1 of the first passive arm module 30.1 is connected to the second connection side 45.2 of the second active arm module 25.2 at one end, and at the other end a further fourth connection side 55.1 of the first passive arm module 30.1 is connected to a second connection side 45.3 of the third active arm module 25.3. In the embodiment, both connection sides of the first passive arm module 30.1 are thus exemplarily embodied as fourth connection sides 55.1 of the first passive arm module 30.1 and thus corresponding and/or complementary to the second connection side 45.2 of the second active arm module 25.2 and to the second connection side 45.3 of the third active arm module 25.3. As a result, the second connection side 45.2 of the second active arm module 25.2 may be arranged at a distance from the second connection side 45.3 of the third active arm module 25.3 in a simple manner, and a predefined design of the robot arm 20 may be implemented in a simple manner. By way of example, FIG. 1 shows a first connection side 40.3 of the third active arm module 25.3 being connected to a second connection side 45.4 of a fourth active arm module 25.4.

In the module system, a second passive arm module 30.2 is exemplarily embodied differently to the first passive arm module 30.1. In the axial direction of the second passive arm module 30.2, the second passive arm module 30.2 is formed shorter than the first passive arm module 30.1. Furthermore, a third connection side 50.2 of the second passive arm module 30.2 is formed identically to the second connection side 45.4 of the fourth active arm module 25.4 and a fourth connection side 55.2 of the second passive arm module 30.2 is formed correspondingly and/or complementarily to the second connection side 45.5 of the fifth active arm module 25.5 and thus identically to the first connection side 40.5 of the fifth active arm module 25.5. Thus, in contrast to the first passive arm module 30.1, the second passive arm module 30.2 has the third connection side 50.2 and the fourth connection side 55.2 of the second passive arm module 30.2 at its ends, respectively, which are different from each other.

At the first connection side 40.5 of the fifth active arm module 25.5, the fifth active arm module 25.5 is connected to a second connection side 45.6 of the sixth active arm module 25.6. A first connection side 40.6 of the sixth active arm module 25.6 is connected to the end effector.

Via the arm modules 18 and their first to fourth connection sides 40, 45, 50, 55, the end effector is supplied with the fluid 51 as described below in further detail and is electrically connected to the electrical power source 52 and data-connected to the data network 53. Similarly, the active and passive arm modules 25, 30 are connected to the data network 53, e.g. to a field bus or an EtherCAT network, in terms of data and to the electrical power source 52 in terms of power via their first to fourth connection sides 40, 45, 50, 55.

Each of the active arm modules 25 includes a first housing 60, each of the first housings 60 internally defining a first housing interior 65. A first connection side 40 is disposed at an end of the first housing 60. The first connection side 40 is rotatably mounted about the axis of rotation $Ra_n$ relative to the first housing 60, and is controllably driven by the drive device of the respective active arm module 25. The second connection side 45 is e.g. inclined, preferably oriented perpendicularly with respect to the first connection side 40, and is connected to the first housing 60 in a torque-proof manner. The first housing interior 65 is arranged for fluidic, electrical and data connection of the first connection side 40 to the second connection side 45, which will be discussed in detail later.

When the drive device of the active arm module 25 is activated, the drive device rotates the first connection side 40 relative to the first housing 60. Depending on the embodiment of the robot arm 20, the drive device thus rotates the active arm module 25, with the exception of its own first connection side 40, about the associated axis of rotation $Ra_n$ or only the first connection side 40 about the associated axis of rotation $Ra_n$.

In FIG. 1, for example, the drive device of the first active arm module 25.1 pivots the first active arm module 25.1 and the arm modules 18 further attached to the second connection side 45.1 of the first active arm module 25.1 and the end effector about the first axis of rotation $Ra_1$. By way of example, the sixth active arm module 25.6 is mounted in identical orientation with respect to the first active arm module 25.1. For example, the drive device of the sixth active arm module 25.6 drives the first connection side 40.6 and rotates the end effector attached to the first connection side 40.6 of the sixth active arm module 25.6. The first housing 60 and the second connection side 45.6 of the sixth active arm module 25.6 are stationary.

In the case of the robot arm 20 shown in FIG. 1, the first axis of rotation $Ra_1$ is not restricted by way of example, i.e. the robot arm 10 may be permanently rotated in the same circumferential direction $Ura_1$. This means that the arm modules 18 shown in FIG. 1 may be used to form a robot arm 15 of any design that may reproduce numerous common kinematics.

It is of course possible to design the respective rotational axis $Ra_n$ as a swivel axis only, i.e. a movement of the respective active arm module 25 is limited to a certain angle, such as angles smaller than: 720°, 540°, 360°, 270°, 180°, 90° or 45°. For example, in FIG. 1, the second axis of rotation $Ra_2$ is preferably restricted to a predefined angle, such as 180°, to prevent the robot arm 20 from striking the robot base 15. Also, a constraint may be imposed on the movement of the active arm modules 25 such that the arm modules 18 do not collide with one another. The restriction may be mechanical or control-related, in particular software-related.

The passive arm modules 30 each include a second housing 70, wherein the second housing 70 is embodied with a hollow body and extends along the longitudinal axis Lan in the axial direction $Arp_n$. In FIG. 1, by way of example, the second housing 70 has a truncated-cone shape with a circular cross-section. The third connection side 50 of the passive arm module 30 is connected to the second housing 70 at one front face of the second housing 70 in a torque-proof manner, and is connected to the second housing 70 in a torque-proof manner. At another front end of the second housing 70, the fourth connection side 55 of the passive arm module 30 is arranged and connected to the second housing 70 in a torque-proof manner. Thereby, due to the hollow embodiment of the second housing 70, the second housing 70 has a particularly high bending and torsional stiffness, so that the passive arm module 30 may transmit a high load.

In the modular system, the arm module 18 may have different sizes. In particular, the first or second housing 60, 70 may have different lengths and/or different cross-sectional areas of the connection sides 40, 45, 50, 55 in order to easily obtain a desired geometric configuration of the robot arm 20 when combining the arm modules 18 from the modular system.

The modular system may be embodied in such a way that the arm modules 18 each belong to different assemblies that have different geometric designs but are functionally identical to one another.

In the embodiment, the first active arm module 25.1 and the second active arm module 25.2 are identically embodied and have the same geometric configuration in terms of structural design. In FIG. 1, the first active arm module 25.1 and the second active arm module 25.2 belong to a first assembly which geometrically has the largest embodiment and the largest extension.

The third active arm module 25.3 and the fourth active arm module 25.4 are geometrically embodied smaller than the first and second active arm modules 25.1, 25.2 so that moments and forces for the first and second active arm modules 25.1 and 25.2 are reduced. They belong to a second assembly. Similarly, the fifth active arm module 25.5 and the sixth active arm module 25.6 belong to a third assembly which has the smallest embodiment. As the arm modules 18 belong to smaller assemblies with increasing distance from the robot base 15, the passive arm module 30 connected to the robot base 15, in the embodiment the third passive arm module 30.3, is relieved of mechanical load.

The above-described design of the modular system has the advantage that with the individual active arm modules 25 and, as the case may be, at least one passive arm module 30, a multi-axis robot arm 20 may be assembled in a simple manner and tailored individually to the requirements from the active or passive arm modules 25, 30 of the modular system.

By manufacturing the arm modules 18 independently of the robot arm 20, the industrial robot 10 shown in FIG. 1 may be assembled in a particularly short time (within a few minutes). Also, after completion of the industrial robot 10, the industrial robot 10 may be flexibly adapted and, if necessary, expanded or reduced by further (arm) modules of the modular system for adapting the industrial robot 10 to a different task. For example, an existing robot arm $Ra_n$ having four rotational axes may be modified by two additional active arm modules 25 (subsequently, if necessary) mounted between the end effector and the existing arm modules 18, e.g. on the industrial robot 10 shown in FIG. 1.

Furthermore, the arrangement of conduits, lines or other connections on the outside of the industrial robot 10 may be dispensed with by the internal guiding of fluid 51, electrical power and data, so that unintentional damage to the industrial robot 10 may be prevented.

Figure 2:
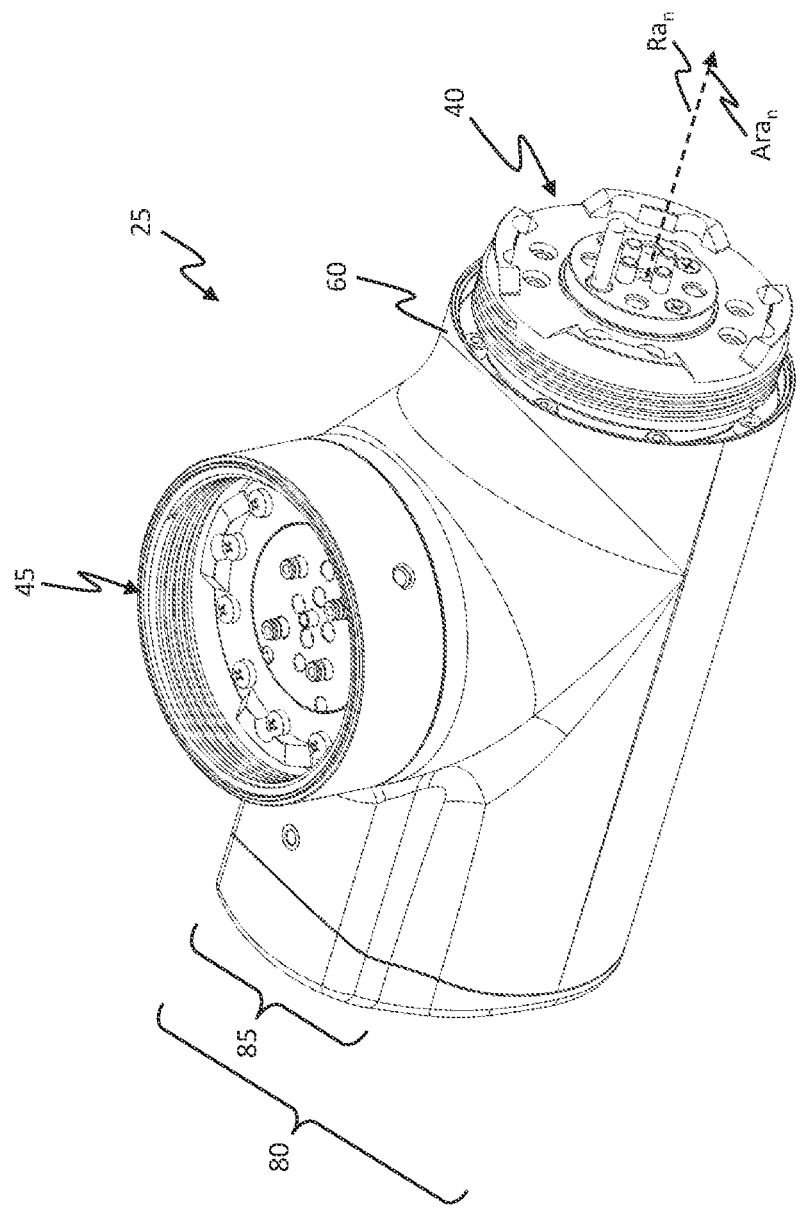
FIG. 2 shows a perspective view of an active arm module shown in FIG. 1 according to a first embodiment.

FIG. 2 shows a perspective view of the active arm module 25 shown in FIG. 1.

The active arm module 25 also has an identical structure in each assembly, but deviating therefrom only the geometric extensions of the individual active arm modules 25 are changed. In other words, the active J-shaped active arm modules 25 of the different assemblies are scaled with respect to one another.

In the embodiment, the first connection side 40 is arranged in a rotational plane perpendicular to the axis of rotation $Ra_n$. The second connection side 45 is arranged at an incline radially outwardly to the axis of rotation $Ra_n$ and is aligned at an incline, preferably perpendicularly, to the first connection side 40.

The first housing 60 comprises a first housing portion 80 that is essentially cylindrical in shape. The first housing section 80 essentially extends about the axis of rotation $Ra_n$. Laterally on a first circumferential side of the first housing section 80, a second housing section 85 is arranged on the first housing section 80, wherein the second housing section 85 is formed narrower than the first housing section 80 in the axial direction $Ara_n$. The second housing section 85 is embodied with a trough shape. On a side facing away from the first housing section 80, the second connection side 45 is arranged on the second housing section 85. Thereby, the second connection side 45 protrudes beyond the second housing section 85. The second connection side 45 may be arranged off-center with respect to a maximum longitudinal extent in the axial direction $Ara_n$. A particularly favorable transmission of force between the first connection side 40 and the second connection side 45 is provided if, in the axial direction $Ara_n$, the second connection side 45 is arranged adjacent to the first connection side 40 on the first housing 60. In particular, this means that a bending stress on the first housing 60 for force transmission is particularly low.

Figure 3:
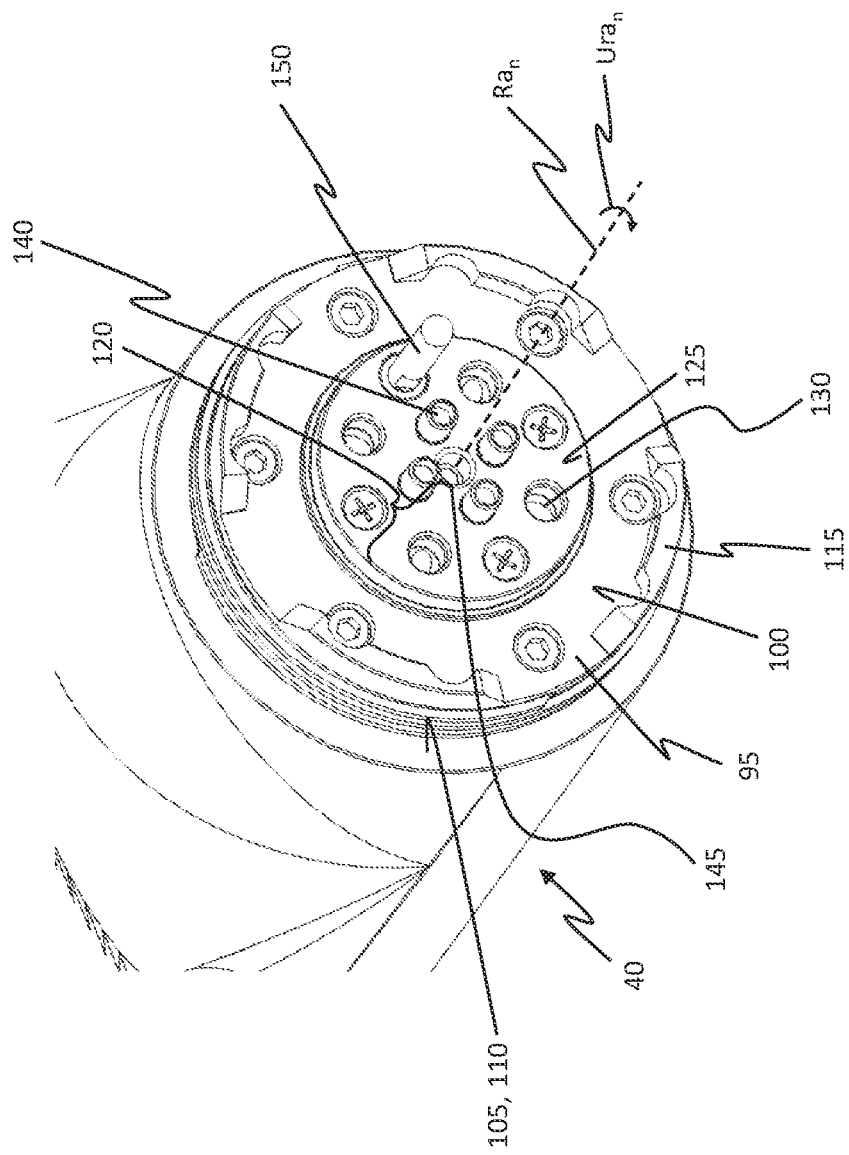
FIG. 3 shows an enlarged perspective view of a first connection side of the first active arm module shown in FIGS. 1 and 2.

FIG. 3 shows an enlarged perspective view of the first connection side 40 of the first active arm module 25 shown in FIGS. 1 and 2.

The first connection side 40 comprises a connection plate 95, the connection plate 95 extending essentially (in its main extension) in a plane of rotation perpendicular to the axis of rotation $Ra_n$. The connector plate 95 has a first front face 100. The first front face 100 is disposed in a plane of rotation perpendicular to the axis of rotation $Ra_n$. At an outer second circumferential side 105 extending in a circular path about the axis of rotation $Ra_n$, the connecting plate 95 has an external thread 110. Radially outwardly adjacent to the outer second circumferential side 105, a first spur toothing 115 is arranged on the first front face 100, the first spur toothing 115 being configured, e.g. as Hirth toothing.

On the radially inner side, the connecting plate 95 has a connecting section 120. The connection section 120 is arranged at a distance in the radial direction Rran from the first spur toothing 115 and is of hollow cylindrical embodiment. The connection section 120 comprises a second front face 125, the second front face 125 being arranged in parallel to the first front face 100. On the rear side, the connection section 120 abuts on the first front face 100 and is mechanically connected to the connection plate 95.

The first connection side 40 includes a first fluid contact device 130, a first power contact device 135, and a first contact device 145 for data connection at the connection section 120.

The first fluid contact device 130 is arranged concentrically around the axis of rotation $Ra_n$. The first power contact device 135 is arranged radially on the inside of the first fluid contact device 130. The first power contact device 135 has at least one first power contact element 140. Preferably, a plurality of first power contact elements 140 are provided, preferably arranged electrically insulated from one another, which are arranged at an offset with regard to one another in the circumferential direction of $Ura_n$, e.g. at an angle of 90°, concentrically about the axis of rotation $Ra_n$. The first contact device 145 is arranged on the axis of rotation $Ra_n$.

Additionally, a pin 150 may be circumferentially disposed on the first connection side 40, the pin 150 protruding beyond the second front face 125.

Figure 4:
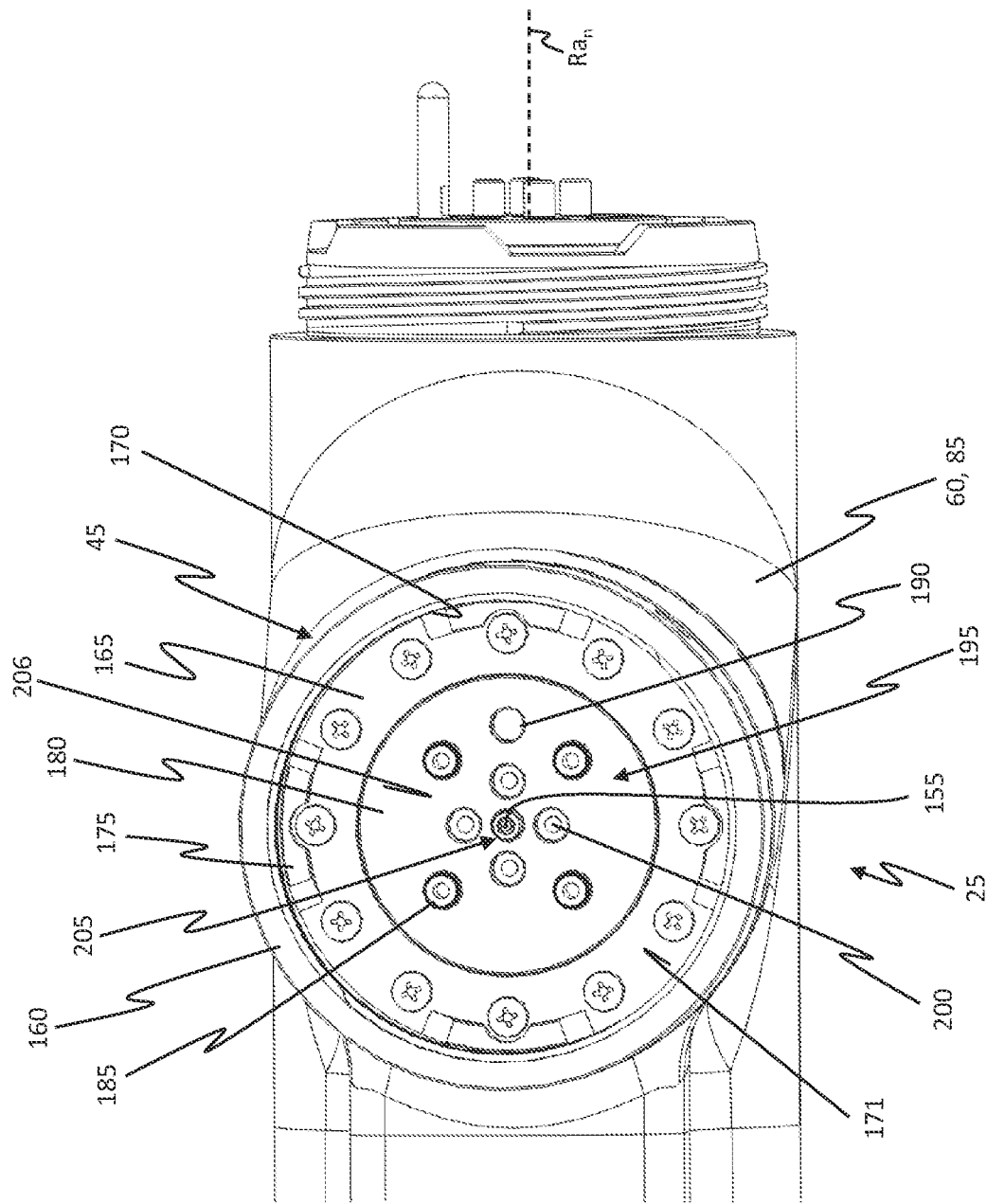
FIG. 4 shows a side view of the active arm module shown in FIGS. 1 to 3, looking at a second connection side.

FIG. 4 shows a side view of the active arm module 25 shown in FIGS. 1 to 3, looking at the second connection side 45.

The second connection side 45 is oriented with respect to a connection axis 155, wherein the connection axis 155 is oriented perpendicular to the axis of rotation $Ra_n$. When assembled, the connection axis 155 and the axis of rotation $Ra_n$ of the active arm module 25 mounted to the second connection side 45 by the first connection side, or the longitudinal axis of the passive arm module mounted to the second connection side 45 by the first connection side overlap. Thus, the connection axis 155 extends in a plane of rotation with respect to the axis of rotation $Ra_n$ or longitudinal axis of the passive or active arm module 25 disposed on the second connection side 45.

The second connection side 45 has, radially outwardly, a fastening ring 160 which extends annularly on a circular path about the connection axis 155. The fastening ring 160 is axially connected to the first housing 60 and is arranged on a side of the second housing section 85 facing away from the first housing section. On an inner side, the fastening ring 160 defines a receptacle 165, the receptacle 165 being essentially cylindrical in its basic shape. At an inner circumferential side, the fastening ring 160 has an internal thread 170, the internal thread 170 being embodied to correspond to the external thread of the first connection side. In the axial direction relative to the connection axis 155 on a side facing the axis of rotation $Ra_n$, the receptacle 165 is bounded by a third front face 171, the third front face 171 extending in a plane perpendicular to the connection axis 155.

A second spur toothing 175 adjoins the internal thread 170 radially on the inside in the receptacle 165. The first spur toothing and the second spur toothing 175 are formed at least complementarily, preferably correspondingly, to each other, so that in the assembled state the first spur toothing and the second spur toothing 175 may engage in each other and may thus exchange a torque in the circumferential direction with respect to the connecting axis 155 or to the axis of rotation $Ra_n$.

Radially inwardly of the second spur toothing 175, the second connection side 45 has a recess 180, the recess 180 being embodied to correspond to the connection section of the first connection side in the radial direction with respect to the connection axis 155. In the recess 180, the second connection side 45 includes at least a second fluid contact device 185, a second power contact device 195, and a second contact device 205. Further, a centering receptacle 190 may be disposed at a base 206 of the recess 180, the centering receptacle 190 being configured to correspond to the pin. The second fluid contact device 185 is configured to correspond to the first fluid contact device, wherein, by way of example, the first fluid contact device is configured as a plug contact and the second fluid contact device 185 is configured as a socket contact.

Radially inwardly of the second fluid contact device 185, the second power contact device 195 is arranged in the recess 180, the second power contact device 195 being configured to correspond to the first power contact device. The first power contact device 195 is exemplarily embodied as a plug-in contact. The second power contact device 195 has at least one second contact element 200, wherein the second contact element 200 may be of socket-like design. Preferably, a plurality of second contact elements 200 are provided which are arranged on a circular path around the connection axis 155 and are electrically insulated from one another.

The second contact device 205 is arranged on the connection axis 155 and is embodied to correspond to the first contact device.

Figure 5:
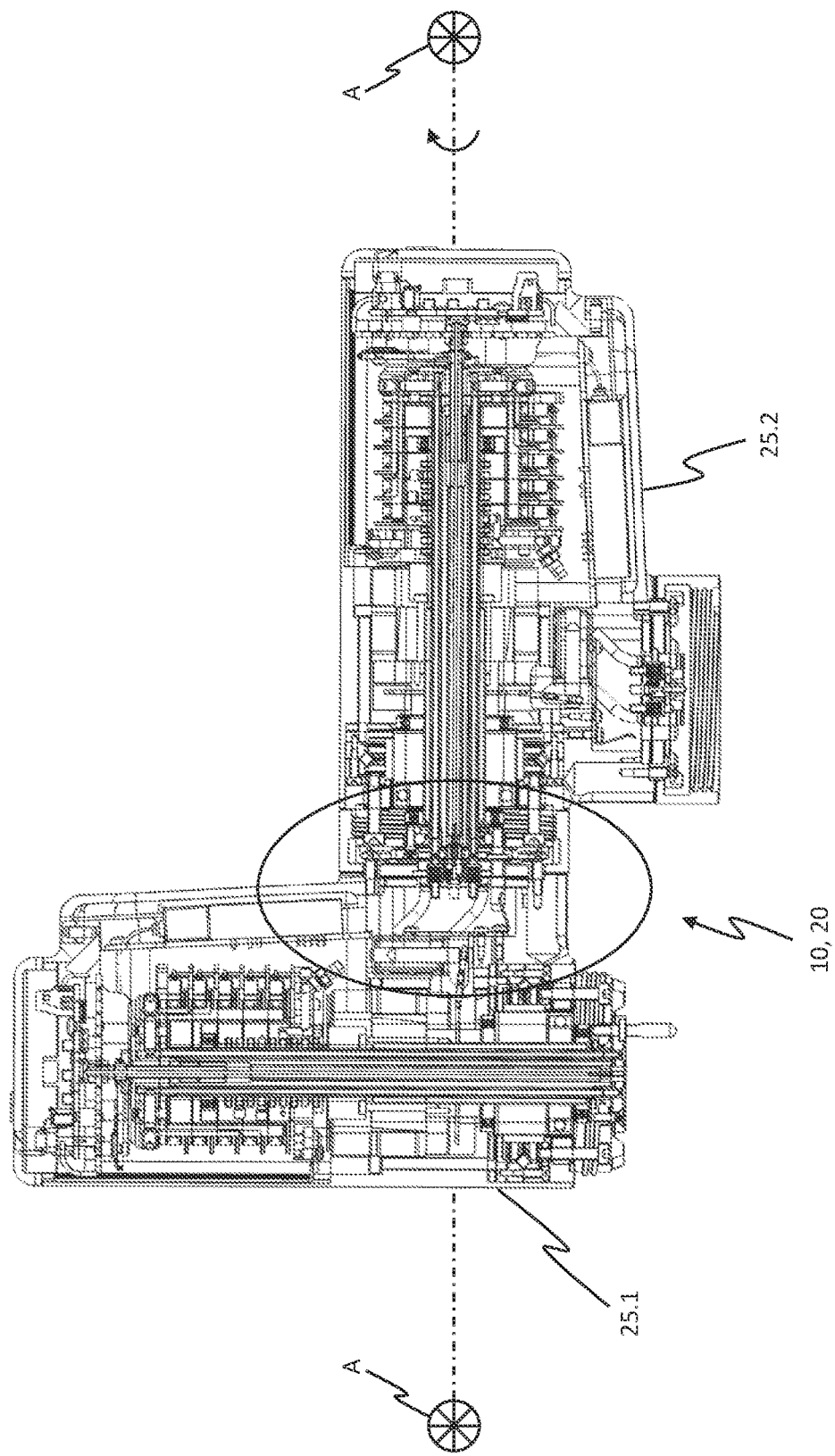
FIG. 5 shows a side view of two active arm modules of the robot arm shown in FIG. 1.
Figure 6:
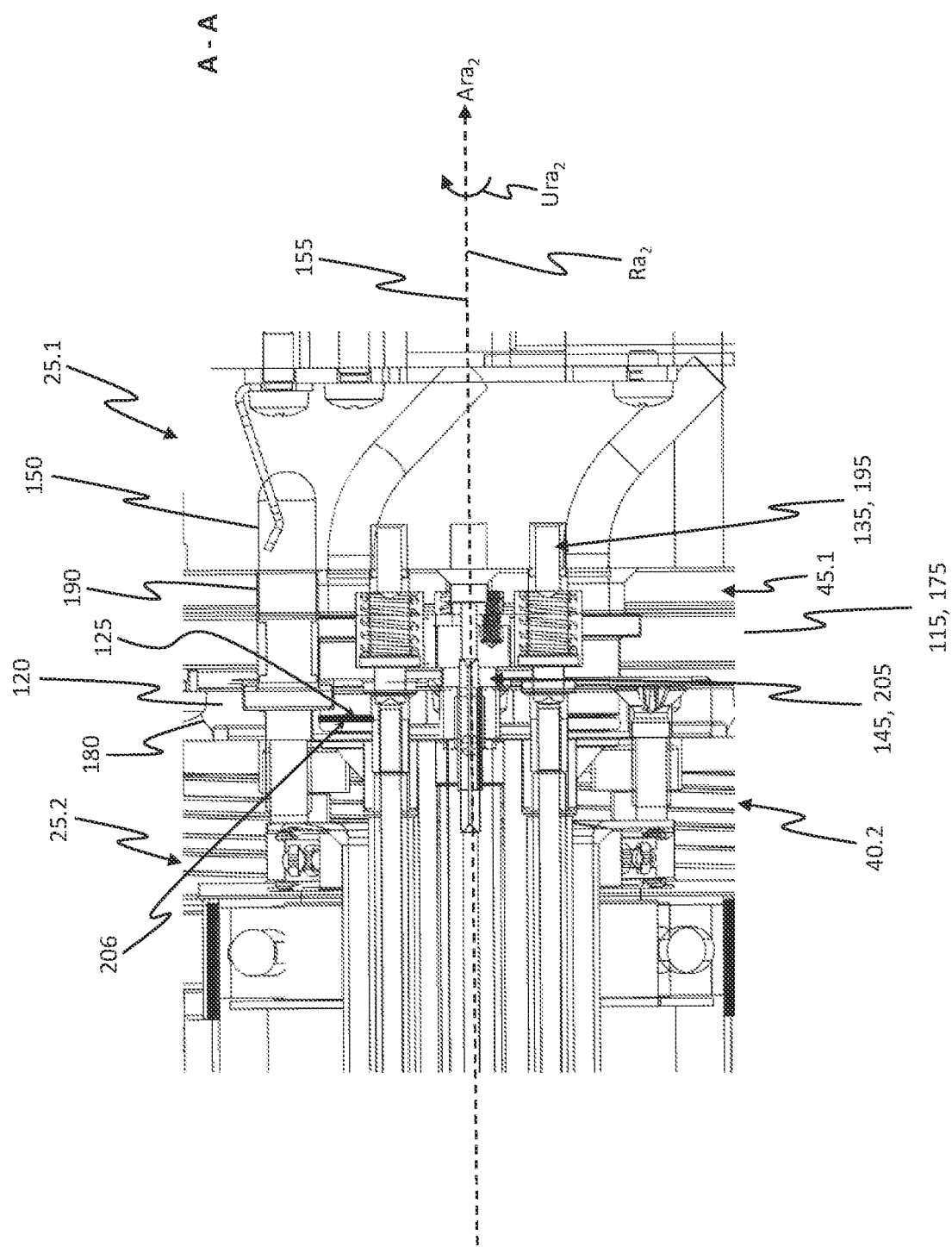
FIG. 6 shows a section marked in FIG. 5 along a sectional plane A-A shown in FIG. 1 through a first active arm module and a second active arm module mounted to the first active arm module.

FIG. 5 shows a side view of two active arm modules of the robot arm shown in FIG. 1, and FIG. 6 shows a detail of a sectional view along a sectional plane A-A shown in FIG. 5 through the first active arm module 25.1 and the second active arm module 25.2 mounted on the first active arm module 25.1. For reasons of clarity, the sectional areas are not marked by hatching in FIG. 6.

The coupling of the first connection side 40 to the second connection side 45 is exemplified by the coupling of the first connection side 40.2 of the second active arm module 25.2 to the second connection side 45.1 of the first active arm module 25.1. The coupling of the other first to fourth connection sides 40, 45 of the other active arm modules 25 and passive arm modules 30 shown in FIG. 1 is identical.

In the assembled state, the connection section 120 engages in the recess 180. The second front face 125 and the base 206 of the recess 180 are pressed against each other in the axial direction $Ara_2$.

In the assembled state, the first contact device 145 contacts the second contact device 205 so that data transmission between the two contact devices 145, 205 is ensured, e.g. by the optical signal. Likewise, the first power contact device contacts the second power contact device 195. Furthermore, the first fluid contact device and the second fluid contact device engage with each other and provide a fluid-tight connection. For orientation in the circumferential direction $Ura_2$, the pin 150 engages the centering receptacle 190 so that in assembly, when the second connection side 45.1 of the first active arm module 25.1 and the first connection side 40.2 of the second active arm module 25.2 are assembled, the orientation of the first connection side 40.2 relative to the second connection side 45.1 is predefined in the circumferential direction, thereby avoiding damage to the first and second contact device 145, 205, the first and second fluid contact device, and the first and second power contact device 135, 195.

Furthermore, the first spur toothing and the second spur toothing engage with each other in such a way that the first connection side 40 and the second connection side 45 are connected to each other in a torque-locking manner. In the assembled state, the connection axis 155 and second overlap the rotational axis $Ra_2$.

Connecting the first connection side 40.2 of the second active arm module 25.2 to the first active arm module 25.1 both mechanically attaches the second active arm module 25.2 to the first active arm module 25.1 and provides a connection for transmitting fluid, optical and/or electrical signal for data transmission and for transmitting electrical power across the first and second connection sides 40.2, 45.1.

Figure 7:
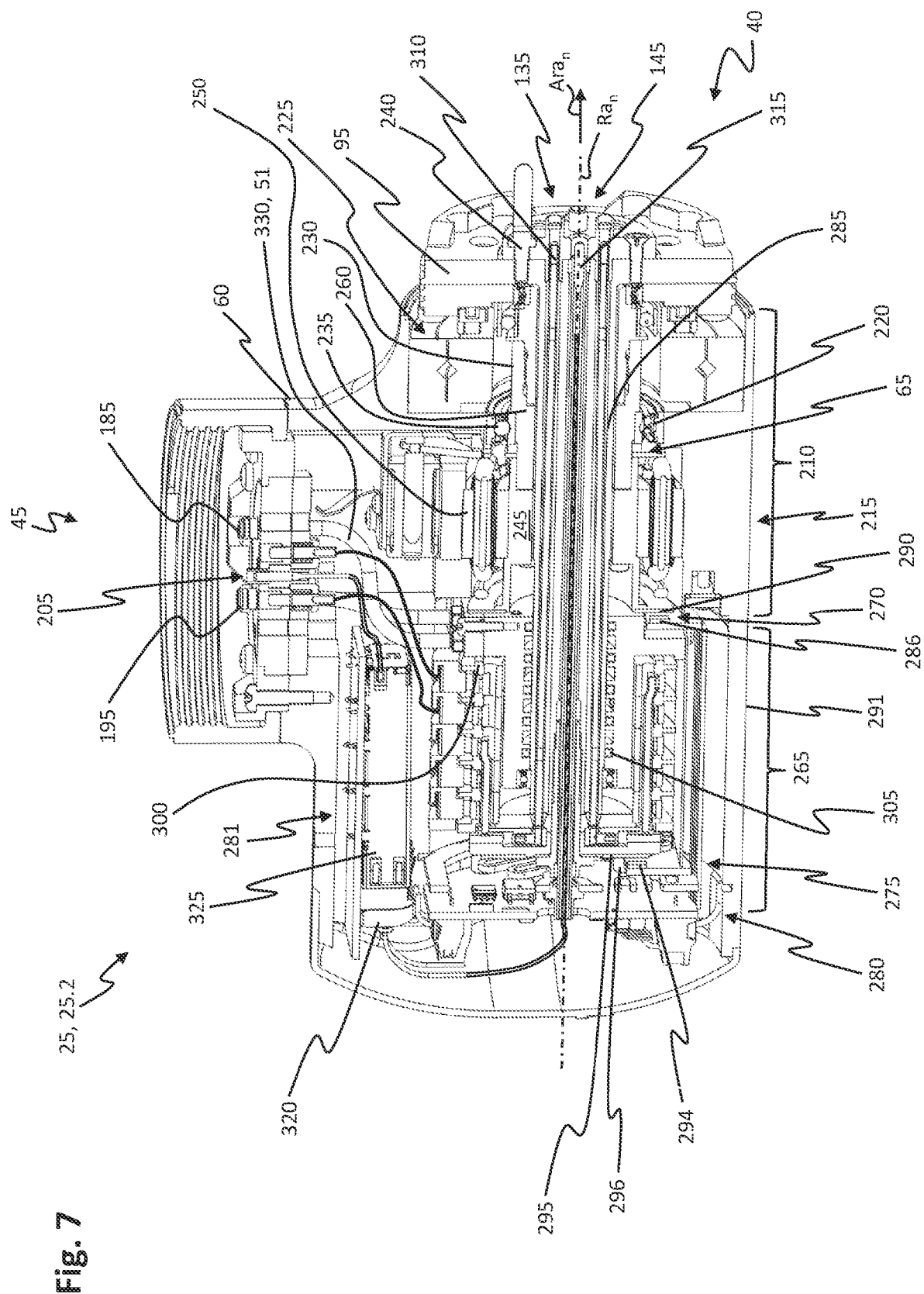
FIG. 7 shows a sectional view through the active arm module shown in FIGS. 1 to 5.

FIG. 7 shows a sectional view through the active arm module 25 shown in FIGS. 1 to 5. For reasons of clarity, the sectional planes are not marked by hatching in FIG. 7.

The active arm module 25 may e.g. be the second active arm module 25.2 shown in FIG. 1. In addition to the first connection side 40 and the second connection side 45 as well as the first housing 60, the active arm module 25 comprises the drive device 210 which is connected to the first connection side 40 in the axial direction $Ara_n$ with respect to the axis of rotation $Ra_n$.

The first housing 60 may be formed integrally or with a plurality of components and may e.g. be cast, and is configured to mechanically transmit forces between the first connection side 40 and the second connection side 45 and to protect the components of the first active arm module 25 arranged in the first housing interior 65 from contamination and/or electromagnetic influences.

The drive device 210 comprises a drive motor 215, a bearing arrangement 220 and a gear device 225. In the axial direction, the gear device 225 is arranged between the drive motor 215 and the first connection side 40. The gear device 225 has a first input side 230, optionally a second input side 235, and an output side 240. The gear device 225 may e.g. comprise a planetary gear and/or an eccentric gear, in particular a cycloidal gear and/or a strain wave gear.

Preferably, the gear device 225 is embodied such that a torque, introduced via the first connection side 40 into the output side 240, is not or only slightly transmitted to the drive motor 215 and does not cause the first input side 230 to rotate. It is of particular advantage if the gear device 225 is self-locking. For example, the torque may be supported on the first housing 60 via the second input side 235.

Exemplarily, the drive motor 215 comprises an electric machine, in particular a brushless electric motor, wherein the drive motor 215 comprises a rotor 245 and a stator 250. The stator 250 is connected to the first housing 60 in a torque-proof manner. The stator 250 comprises windings that form a rotating electromagnetic field acting about the axis of rotation $Ra_n$ to drive the rotor 245, which is e.g. equipped with permanent magnets.

Radially inwardly with regard to the rotor 245, the drive device 210 has a first hollow shaft 260. The first hollow shaft 260 is also arranged at least in sections radially inwardly with regard to the gear device 225. Thereby, on one axial side the first hollow shaft 260 is connected to the rotor 245 and on another side the first hollow shaft 260 is connected to the first input side 230 of the gear device 225 in a torque-locking manner. The first hollow shaft 260 may also be referred to as a fast shaft, as during operation of the active arm module 25, the first hollow shaft 260 rotates at a motor speed of the rotor 245.

The bearing arrangement 220 rotatably supports the first hollow shaft 260 about the axis of rotation $Ra_n$. The second input side 235 is connected to the first housing 60 in a torque-proof manner. The gear device 225 is configured to translate an input speed of the rotor 245 to an output speed by at least a gear ratio of from 1:30 to preferably 1:5000, particularly from 1:50 to 1:200. The output side 240 of the gear device 225 is connected to the first connection side 40 in a torque-proof manner. As a result, during operation of the input device 210, the input device 210 drives the first connection side 40. In operation, the first connection side 40 rotates at the output speed.

Axially on a side opposite the first connection side 40, the active arm module 25 has a transfer device 265. Axially between the drive motor 215 and the transfer device 265, the active arm module 25 comprises a first sensor device 270. Axially on a side of the transfer device 265 facing away from the drive motor 215, a first control device 280 is further arranged. Moreover, the active arm module 25 comprises a converter 281 in the first housing interior. The converter 281 and the first control device 280 may be data-connected to each other.

The first control device 280 is electrically connected to the drive motor 215 and is configured to control and/or regulate the drive motor 215. A second sensor device 275 of the active arm module 25, which is also generally referred to only as the sensor device 275, is arranged axially between the transfer device 265 and the control device 280.

The first sensor device 270 may be an optical rotary encoder or a magnetic rotary encoder and includes at least a first sensor 286 and a first signal element 290, wherein the first signal element 290 is coupled to the first hollow shaft 260 in a torque-proof manner and thus rotates about the axis of rotation $Ra_n$ during operation. The first sensor 286 is coupled to the first housing 60 in a torque-proof manner. The first sensor 286 senses the first signal element 290 to detect a rotational speed and/or a position of the first hollow shaft 260 relative to the first housing 60. The first sensor 286 is electrically connected to the first control device 280 via a first connection 291. The first sensor 286 provides a first position signal correlating to the position and/or rotational speed to the first control device 280 with first information via the first connection 291, which is detected by the first control device 280. The first signal element 290 may be disc-shaped and have a predefined detection structure for detection by the first sensor 286.

Additionally, the active arm module 25 includes a second hollow shaft 285, the second hollow shaft 285 essentially extending across a majority of the axial width within the first housing interior 65. At one end, the second hollow shaft 285 is connected to the first connection side 40 in a torque-proof manner. The second hollow shaft 285 and the connecting plate 95 may be integrally formed and consist of coordinated materials. The second hollow shaft 285 is disposed inside of the first hollow shaft 260 and extends through the first hollow shaft 260. The bearing arrangement 220 rotatably supports the second hollow shaft 285 relative to the first hollow shaft 260 about the axis of rotation $Ra_n$. The second hollow shaft 285 is thereby axially longer than the first hollow shaft 260. The second hollow shaft 285 further extends substantially completely through the transfer device 265 and the first sensor device 270. The second hollow shaft 285 rotates at the output speed during operation of the active arm module 25, in particular the drive device 210.

The second sensor device 275 is configured differently from the first sensor device 270 and includes a second sensor 294 and a second signal element 295, wherein the second signal element 295 is disc-shaped and is connected to the second hollow shaft 285 in a torque-proof manner. The second sensor 294 is electrically connected to the first control device 280 by a second connection 296. The second sensor 294 senses the second signal element 295 to detect a rotational speed and/or a position of the second hollow shaft 285 relative to the first housing 60. The second sensor 294 provides a second position signal (also generally referred to as a position signal) correlated to the position and/or rotational speed of the second hollow shaft 285 to the first control device 280 including a second information on the second connection 296 detected by the first control device 280.

The first control device 280 is embodied to determine a position of the second hollow shaft 285 based on the second information (provided by the second position signal). The first information is taken into account by the first control device 280 in a control/regulation of the drive motor 215, allowing the first control device 280 to move the first connection side 40 of the first connection side 40 relative to the first housing 60 with particular precision. This is particularly advantageous since the rotation about the axis of rotation $Ra_n$ is not mechanically limited, and thus no mechanical stops are provided for adjustment.

The 265 includes an encoder 300 connected to the first housing 60 in a torque-proof manner and a transfer rotor 305 rotatably mounted about the rotational axis $Ra_n$. Through the second hollow shaft 285, the transfer rotor 305 is connected to the first connection side 40 mechanically and electrically connected to the first power contact device 135 via a third electrical connection 310 in a torque-proof manner. The third connection 310 is electrically isolated from the second hollow shaft 285. The transfer rotor 305 is further electrically connected to the encoder 300. For example, the encoder 300 and the transfer rotor 305 may include at least one slip ring device. The encoder 300 is electrically connected to the first control device 280 and the second power contact device 195. As a result, the first power contact device 135 is electrically connected to the second power contact device 195 and electrically connected to the first control device 280 for transferring electrical power. The control device 280 is electrically connected on the output side to the drive motor 215.

Further, at least one fluid channel is disposed in the second hollow shaft 285, the fluid channel fluidly connecting the first fluid contact device to the transfer rotor 305. Additionally, the transfer rotor 305 may also provide a fluid connection to the encoder 300. The second fluid contact device 185 is fluidically connected to the encoder 300, e.g. via a tube component 330. As a result, fluid 51 may be exchanged between the first fluid contact device and the second fluid contact device 185 via the fluid channel disposed in the second hollow shaft 285, as well as the transfer rotor 305 and the encoder 300 and the tube component 330.

A first optical waveguide 315 is arranged concentrically in the second hollow shaft 285, which is guided along the axis of rotation $Ra_n$ and connects the first contact device with the converter 281. The first contact device is thereby embodied as a rotary transfer. The first optical waveguide 315 is arranged in a torque-proof manner relative to the first housing during operation of the active arm module 25. The converter 281 is configured to detect an optical (data) signal introduced into the first optical waveguide 315 across the first optical contact device and to both convert it into an electrical data signal and send it to the first control device 280 and to send a signal via the same path. The first control device 280 is electrically connected to the converter 281 for data.

In the following, FIG. 7 will be explained in connection with FIG. 1 and both figures will be referred to accordingly.

During operation of the industrial robot 10, the fluid 51, the optical signal for transmitting data information (in particular control information and/or safety information) on the data network 53 and the electrical power are provided by the electrical power source 52 via the robot base 15 and are transmitted to the first active arm module 25.1 via the first connection side 40.1. The fluid 51, the electrical power, and the optical signal are transmitted through the first active arm module 25.1 to the second connection side 45.1 of the first active arm module 25.1. The fluid 51, the optical signal and the electrical power are introduced into the second active arm module 25.2 via the second connection side 45.1 of the first active arm module 25.1 and the first connection side 40.2 of the second active arm module 25.2.

Furthermore, with the first power contact device 135, the electrical power is conducted from the first connection side 40.2 of the second active arm module 25.2 via the third electrical connection 310 to the transfer device 265, where the electrical power is tapped from the transfer rotor 305 via the encoder 300. The electrical connection of the first control device 280 on the input side to the transfer device 265 provides electrical power to the first control device 280. Based on the information provided via the electrical data signal and the determined position of the first connection side 40.1 of the first active arm module 25.1, the first control device 280 drives the drive device 210, in particular the drive motor 215. When the drive motor 215 is activated, the drive motor 215 rotates the first connection side 40.2 of the second active arm module 25.2 about the second axis of rotation $Ra_2$ and, in doing so, rotates the first housing 60 of the second active arm module 25.2 relative to the first active arm module 25.1, in particular relative to the first housing 60 of the first active arm module 25.1.

The embodiment described in FIG. 7 does not limit the rotation of the second active arm module 25.2 relative to the first active arm module 25.1. Furthermore, the embodiment described in FIG. 7 directs fluid through the second active arm module 25.2 toward the second connection side 45.2 of the second active arm module 25.2 in the first housing 60 of the second active arm module 25.2.

Likewise, on the inside of the first housing 60, the electrical energy is further transmitted to the second electrical contact device 195. The converter 281 converts the detected electrical data signal and/or optical (data) signal into another optical (data) signal, which is transmitted to the second contact device 205 by a second optical waveguide 325.

If the second active arm module 25.2 rotates relative to the first active arm module 25.1, the third to sixth active arm modules 25.3 to 25.6 arranged on the side of the second active arm module 25.2 facing away from the robot base 15 as well as the first and second passive arm modules 30.1 and 30.2 are also pivoted via the mechanical coupling of the second connection side 45.2 of the second active arm module 25.2. The coupling and implementation of the fluid 51, the electrical power and the optical signal as data signal explained with regard to the first and second active arm modules 25.1 and 25.2 is also carried out analogously for the third to sixth active arm modules 25.3 to 25.6.

At the sixth active arm module 25.6, the fluid 51, the optical signal and the electrical power are transferred to the end effector at the first connection side 40.6 of the sixth active arm module 25.6. For example, the end effector may be operated by the fluid 51. For example, the end effector may include a pneumatic gripper. Likewise, with the electrical power transmitted via the robot arm 20 from the robot base 15 to the end effector, electrical power may also be supplied to the end effector, at least in part.

Furthermore, a high-speed data transmission between the robot base 15 and the end effector is realized via the active and passive arm modules 25, 30. An achievable data rate via the first and second contact devices 145, 205 or via the active and passive arm modules 25, 30 is at least 1 gigabit and is particularly suitable for operation with an EtherCAT standard. Furthermore, the internal guiding of the optical waveguides 315, 325 in the first housing 60 ensures that these particularly sensitive components are not damaged, which ensures robust and reliable functioning of the industrial robot 10 in an industrial environment during data transmission between the robot base 15 and the end effector. Furthermore, the above-described embodiment also ensures real-time capability via EtherCAT. Likewise, the solution described above is particularly cost-effective and space-saving.

Figure 8:
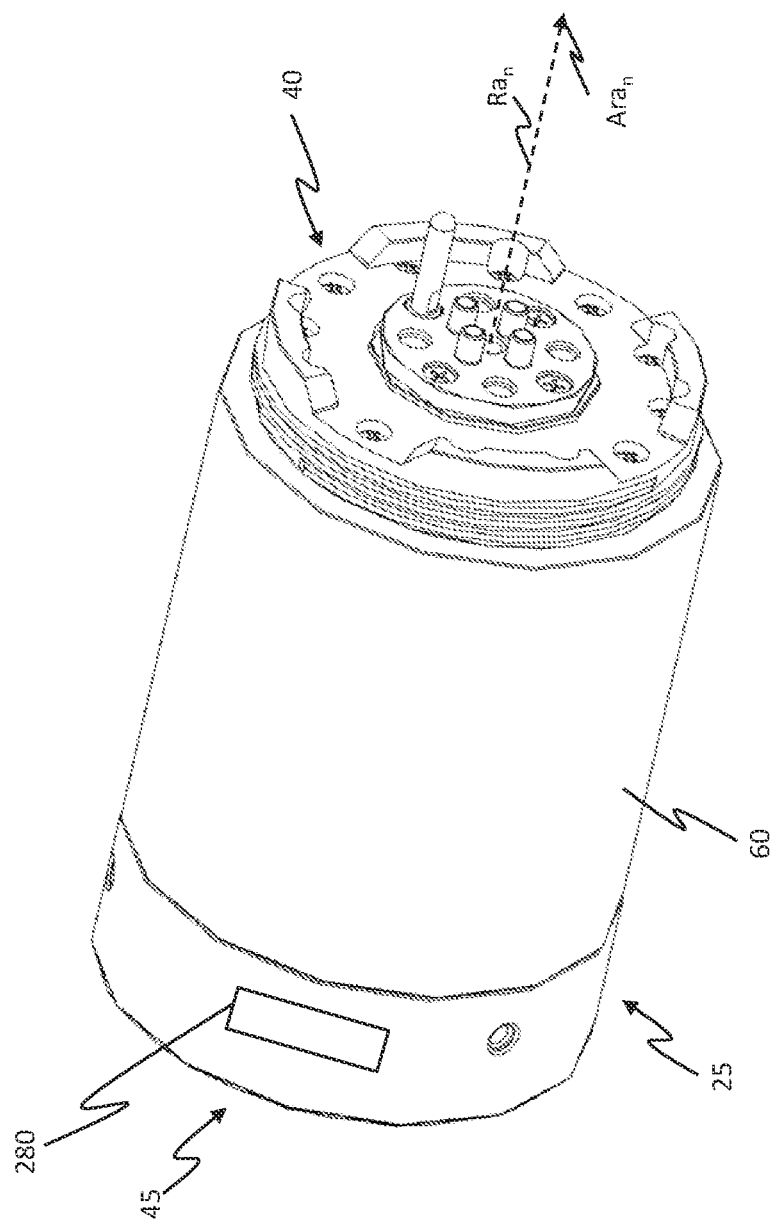
FIG. 8 shows a perspective view of an active arm module according to a second embodiment.

FIG. 8 shows a perspective view of an active arm module 25 according to a second embodiment.

The active arm module 25 is essentially embodied identically to the active arm modules shown in FIGS. 1 to 5. Deviating therefrom, the active arm module 25 in FIG. 8 is formed as an I-module, so that the first housing 60 extends along the axis of rotation $Ra_n$ in an essentially straight line. The first housing 60 is exemplarily tubular, in particular hollow cylindrical.

The first connection side 40 is arranged in a first plane of rotation and the second connection side 45 is arranged offset in axial direction $Ara_n$ in a second plane of rotation. The second connection side 45 thus connects to the first control device 280 in the axial direction $Ara_n$. The first connection side 40 is rotatable about the axis of rotation $Ra_n$, whereas, on the other hand, as already explained in FIGS. 1 to 7, the second connection side 45 is connected to the first housing 60 of the active arm module 25 in a torque-proof manner. The operation of the active arm module 25 explained in FIG. 8 is carried out in the same way as explained in FIGS. 1 and 7 in connection with the J-shaped active arm module 25 shown there.

Figure 9:
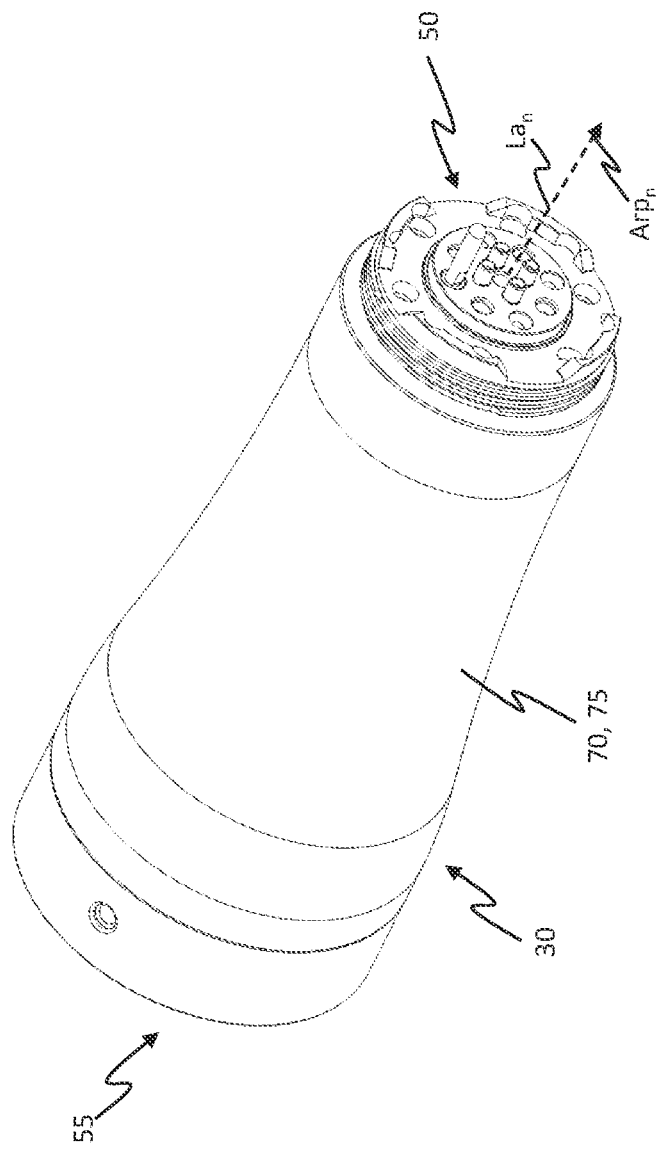
FIG. 9 shows a perspective view of a passive arm module shown in FIG. 1 according to a first embodiment.

FIG. 9 shows a perspective view of the passive arm module 30 shown in FIG. 1 according to a first embodiment.

The exemplary passive arm module 30 of the modular system shown in FIG. 9 is essentially embodied identically to the active arm module shown in FIG. 8. For example, the embodiment of the passive arm module 30 shown in FIG. 9 is used as the second passive arm module 30.2 in FIG. 1.

As previously explained in FIG. 1, the passive arm module 30 includes the third connection side 50, the fourth connection side 55, and the second housing 70. The third connection side 50 and the fourth connection side 55 are each connected to the second housing 70 in a torque-proof manner. In the embodiment, by way of example, the third connection side 50 is formed identically to the first connection side of the active arm module (shown in detail in FIG. 3) and the fourth connection side 55 is formed identically to the second connection side of the active arm module (shown in detail in FIG. 4).

The second housing 70 is hollow and tapers from the fourth connection side 55 to the third connection side 50 and defines the second housing interior 75. Compared to the active arm module shown in FIG. 8, the first control device as well as the drive device and the transfer device are omitted in the passive arm module 30. A fluid line for fluidically connecting the third connection side 50 to the fourth connection side 55 as well as at least one electrical cable for electrically connecting the third connection side 50 to the fourth connection side 55 and/or a further optical waveguide for optically connecting the third connection side 50 to the fourth connection side 55 may run in the second housing interior 75.

When the industrial robot 10 is assembled (as shown in FIG. 1), the optical signal, electrical power, and fluid are e.g. exchanged between the fourth active arm module 25.4 and the fifth active arm module 25.5 by the passive second arm module 30.2 via the third connection side 50 and the fourth connection side 55.

The first passive arm module 30.1 shown in FIG. 1 forms a second embodiment of the passive arm module 30 and is modified with regard to the first embodiment of the passive arm module 30 shown in FIG. 9 in that the fourth connection side 55 and the third connection side 50 are identical to each other and identical to the first connection side of the active arm module.

The identical embodiment of the third connection side 50 and the fourth connection side 55 may also be identical only in terms of design in such a way that the passive arm module 30 serves as an adapter between two modules of the modular system and thus in its geometric dimensioning of the third and fourth connection sides 50, 55 the fourth connection side 55 is e.g. selected to be larger than the third connection side 50.

In a third embodiment of the passive arm module 30, the passive arm module 30 is essentially embodied identically to the first embodiment and may additionally perform the adapter function. Here, for example, the third connection side 50 may be configured to connect to the second connection side of active arm modules from the first assembly, and the fourth connection side 55 may be dimensioned to connect to the first connection side of the active arm module from the second assembly.

In a fourth embodiment of the passive arm module 30, which is essentially identical to the first embodiment of the passive arm module 30 shown in FIG. 9, the third connection side 50 and the fourth connection side 55 may be configured to correspond to each other, wherein the first connection side of the active arm module may be connected to the third connection side 50 and the second connection side of the active arm module may be connected to the fourth connection side 55. Thus, by way of example, the third connection side 50 is identical to the second connection side and the fourth connection side is identical to the first connection side.

Figure 10:
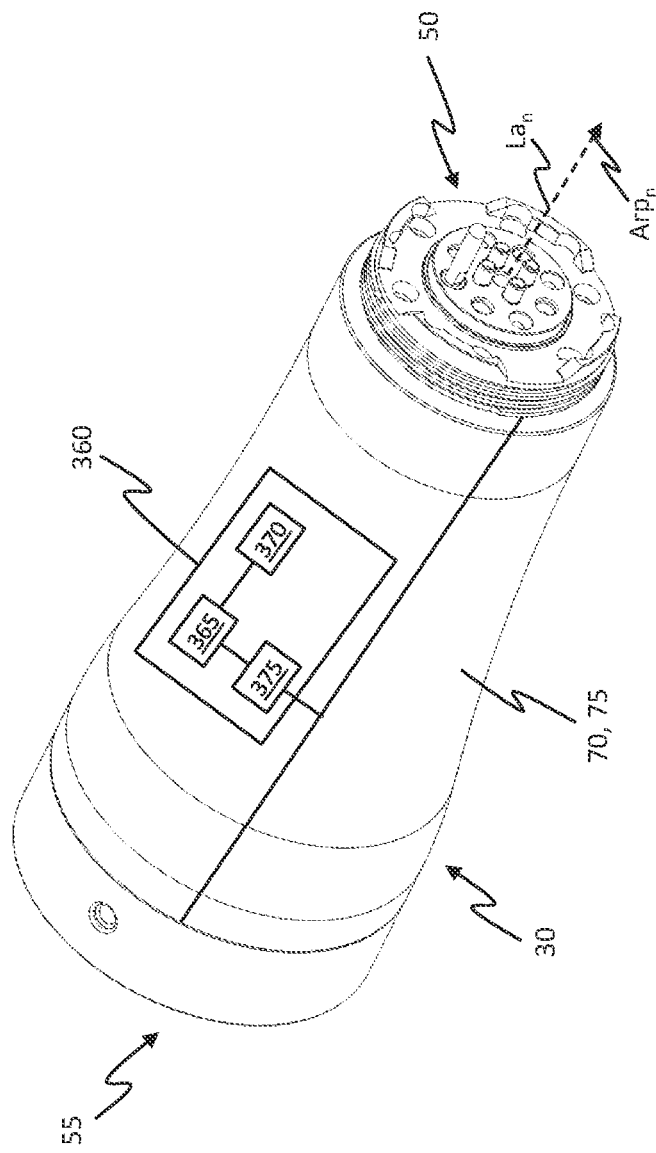
FIG. 10 shows a perspective view of a passive arm module according to a fifth embodiment.

FIG. 10 shows a perspective view of a passive arm module 30 according to a fifth embodiment.

The passive arm module 30 is essentially identical to the first embodiment of the passive arm module 30 shown in FIG. 9. In the following, only the differences between the passive arm module 30 shown in FIG. 10 and the passive arm module shown in FIG. 9 will be discussed.

In the second housing interior 75, the passive arm module 30 shown in FIG. 10 has a control unit 360, the control unit 360 being supplied with electrical power via the third and/or fourth connection side 50, 55 and being data-connected to the further active and passive arm modules and/or the data network.

The control device 360 includes a second control device 365, a data storage device 370 connected to the second control device 365, and an interface 375 connected to the second control device 365, wherein the interface 375 is electrically and/or optically connected to the third connection side 50 and/or to the fourth connection side 55.

A predefined control program, in particular a computer-implemented algorithm, may be stored in the data memory 370. In particular, the control device 360 may be embodied as an industrial PC or function terminal, in particular as an I/O terminal. The second control device 365 of the control device 360 is embodied to determine a control signal on the basis of the predefined control program and to provide the control signal, e.g. as an optical signal, to the third connection side 50 and/or to the fourth connection side 55 via the interface 375.

By arranging the control unit 360 in the second housing interior 75, the industrial robot may have a particularly compact embodiment. In particular, additional switch cabinets may be dispensed with. It is particularly advantageous if the control unit 360 is arranged on the side of the robot arm facing the robot base.

Furthermore, a combination with the passive arm module 30 shown in FIG. 10 and the first passive arm module 30.1 shown in FIG. 1 is conceivable, in which the first passive arm module 30.1 e.g. comprises the control unit.

Figure 11:
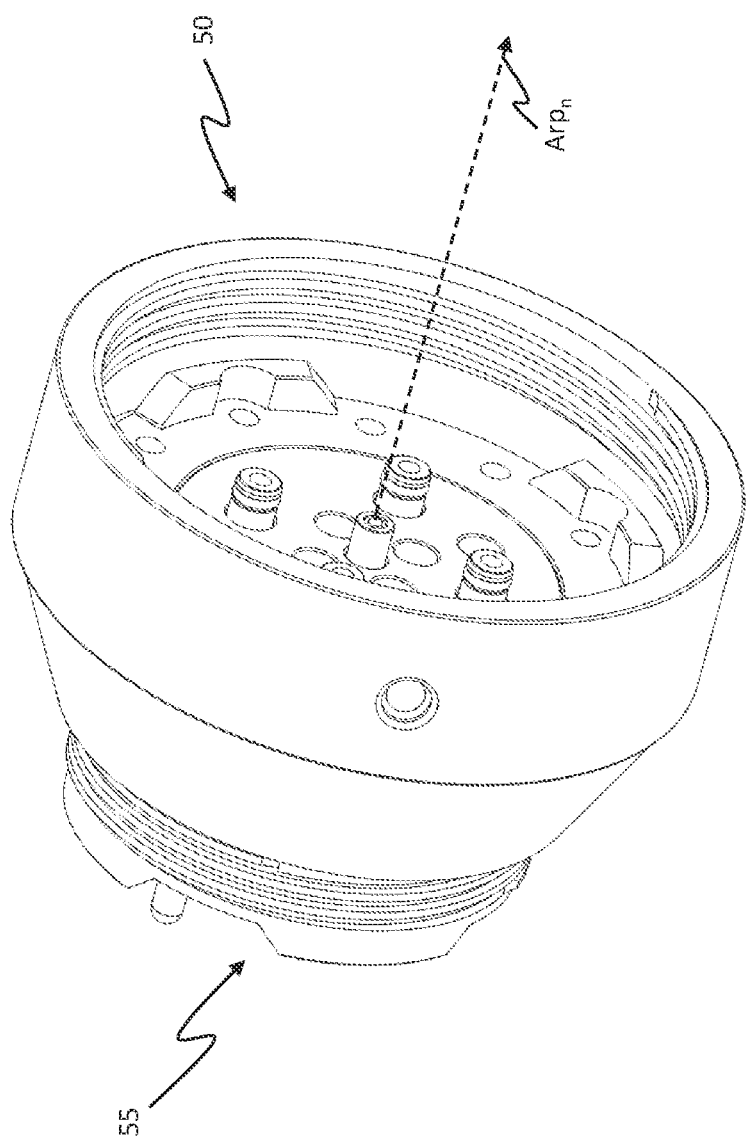
FIG. 11 shows a perspective view of a passive arm module according to a sixth embodiment.

FIG. 11 shows a perspective view of a passive arm module 30 according to a sixth embodiment.

The passive arm module 30 is essentially identical to the passive arm module 30 shown in FIG. 9. In the following, only the differences between the passive arm module 30 shown in FIG. 11 and the passive arm module 30 shown in FIG. 9 will be discussed.

In the longitudinal direction $Arp_n$, the passive arm module 30 is embodied to be shorter than the passive arm module 30 shown in FIG. 9. The fourth connection side 55 is embodied to be connected to a second connection side of active arm modules from the second assembly and the third connection side 50 is embodied to be connected to a first connection side of active arm modules from an assembly that is smaller than the first assembly, e.g. the third assembly. Thus, the passive arm module 30 shown in FIG. 11 takes over the adapter function. For example, in FIG. 1, the fourth connection side 55.2 of the second passive arm module 30.2 may be connected to the second connection side 45.5 of the fifth active arm module 25.5. The third connection side 50.2 of the second passive arm module 30.2 is connected to the first connection side 40.4 of the fourth active arm module 25.4.

The fluidic connection for transmitting the fluid between the fourth active arm module 25.4 (cf. FIG. 1) (belonging to the second assembly) and the fifth active arm module 25.5 (cf. FIG. 1) (belonging to the third assembly) is ensured via the passive arm module 30, also shown as an adapter element in FIG. 11. Furthermore, in addition to a mechanical connection and transmission of forces, a transmission of the optical signal for the data connection of the fifth active arm module 25.5 with the fourth active arm module 25.4 as well as an electrical connection for the electrical power transmission via the second passive arm module 30.2 (cf. FIG. 1) is ensured.

Figure 12:
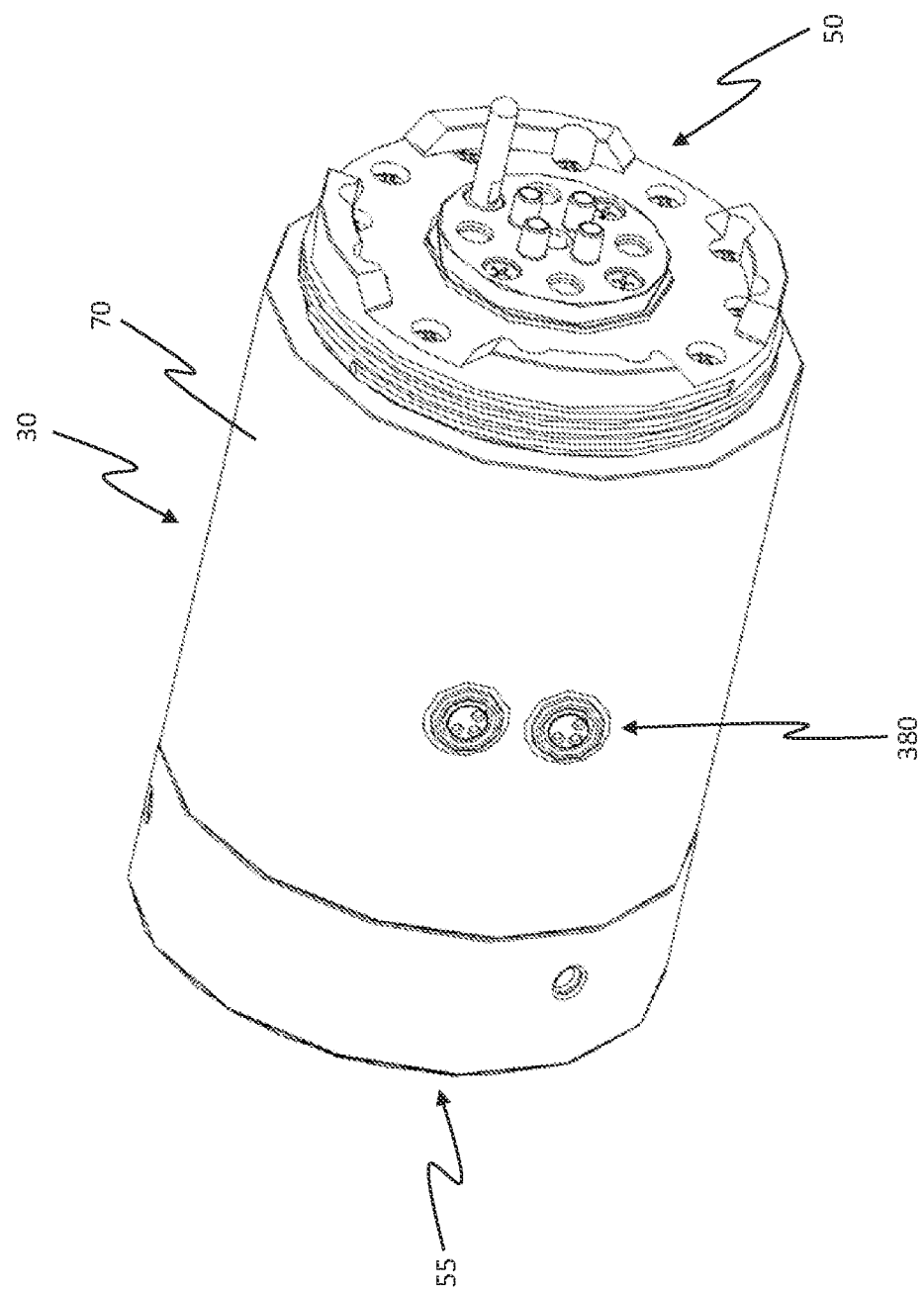
FIG. 12 shows a perspective view of a passive arm module according to a seventh embodiment.

FIG. 12 shows a perspective view of a passive arm module 30 according to a seventh embodiment.

The passive arm module 30 is essentially identical to the passive arm module 30 shown in FIG. 9. In the following, only the differences between the passive arm module 30 shown in FIG. 12 and the first embodiment of the passive arm module shown in FIG. 9 will be discussed.

In addition, a third power contact device 380 is exemplarily arranged on the outside of the second housing 70. The third power contact device 380 is electrically connected to the first power contact device and/or the second power contact device. The third power contact device 380 may e.g. be used to supply additional electrical energy to the robot arm. Electrical energy/power may also be provided for additional peripheral devices, e.g. via the third power contact device 380 to supply power to the peripheral device.

Figure 13:
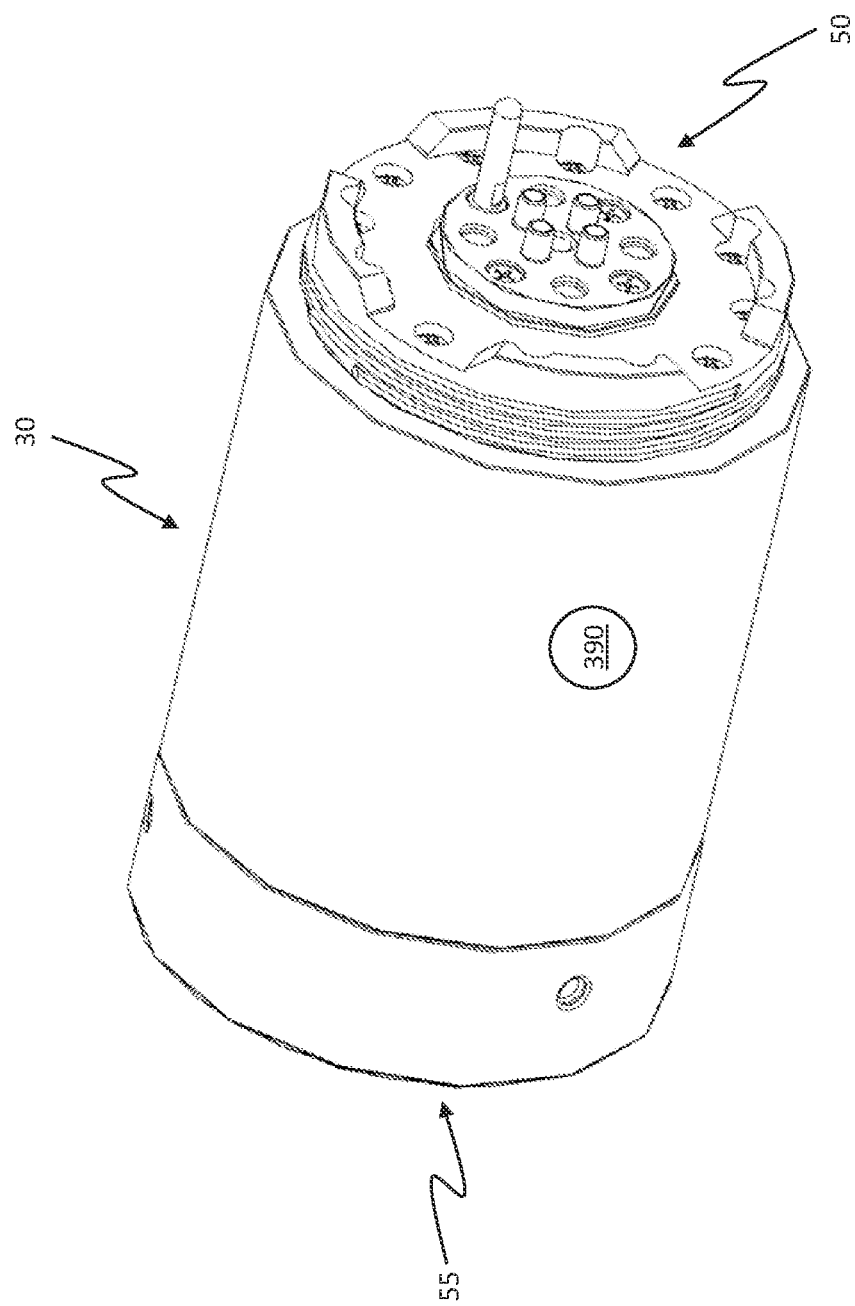
FIG. 13 shows a perspective view of a passive arm module according to an eighth embodiment.

FIG. 13 shows a perspective view of a passive arm module 30 according to an eighth embodiment.

The passive arm module 30 shown in FIG. 13 is essentially identical to the first embodiment of the passive arm module shown in FIG. 9. In the following, only the differences between the passive arm module 30 shown in FIG. 13 and the first embodiment of the passive arm module shown in FIG. 9 will be discussed.

A third contact device 390 is arranged on the outside of the second housing 70. The third contact device 390 is data-connected to the converter. As a result, an additional further optical signal or an electrical data signal may be fed out laterally from the passive arm module 30 via the third contact device 390, or an optical signal or an electrical data signal with data information may be fed into the passive arm module 30 via the third contact device 390 and the data network may e.g. be connected to the robot arm.

This means, for example, that a peripheral device in the form of a camera may be data-connected to the industrial robot via the passive arm module 30 shown in FIG. 13. It is particularly advantageous if the passive arm module 30 shown in FIG. 13 is arranged particularly close to the mounting location of the camera on the industrial robot, so that a third optical waveguide routed outside the industrial robot and connected to the third contact device 390 may be kept particularly short.

Figure 14:
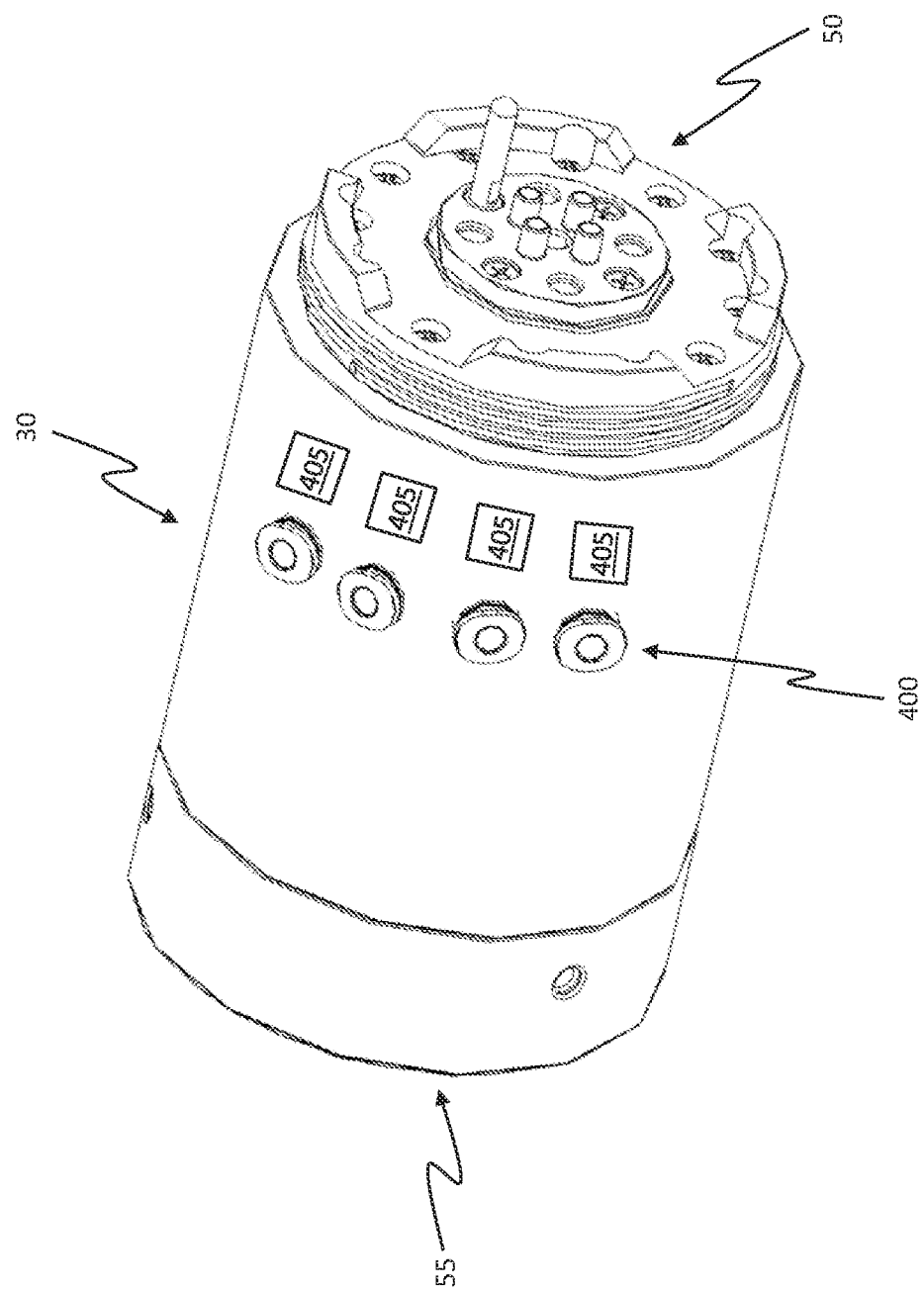
FIG. 14 shows a perspective view of a passive arm module according to a ninth embodiment.

FIG. 14 shows a perspective view of a passive arm module 30 according to a ninth embodiment.

The passive arm module 30 is essentially identical to the passive arm module 30 shown in FIG. 9. In the following, only the differences between the passive arm module 30 shown in FIG. 14 and the first embodiment of the passive arm module shown in FIG. 9 will be discussed.

The passive arm module 30 shown in FIG. 14 additionally comprises at least one third fluid contact device 400. In FIG. 14, the passive arm module 30 has a plurality of third fluid contact devices 400 as an example. The third fluid contact device 400 is circumferentially arranged on the second housing 70. In addition, the passive arm module 30 shown in FIG. 14 may have a magnet valve 405 for each third fluid contact device 400, wherein the magnet valve 405 may be supplied with electrical energy via the third and/or fourth connection side 50, 55.

With regard to fluid, the magnet valve 405 is arranged between the first and/or second fluid contact device and the third fluid contact device 400. The magnet valve 405 has at least one open position and one closed position, wherein in the closed position the third fluid contact device 400 is fluidically separated from the first and/or second fluid contact device of the third or fourth connection side 50, 55.

In the open position, the third fluid contact device 400 is fluidically connected to the first and/or second fluid contact device of the third and/or fourth connection side 50, 55. The magnet valve 405 may further be data-connected to the first and/or second contact device of the third and/or fourth connection side 50, 55, so that the magnet valve 405 may be controlled by the optical signal.

The third fluid contact device 400 may be fluidly connected to the end effector by a line, and/or the fluid may be fed into or fed out of the passive arm module 30.

Figure 15:
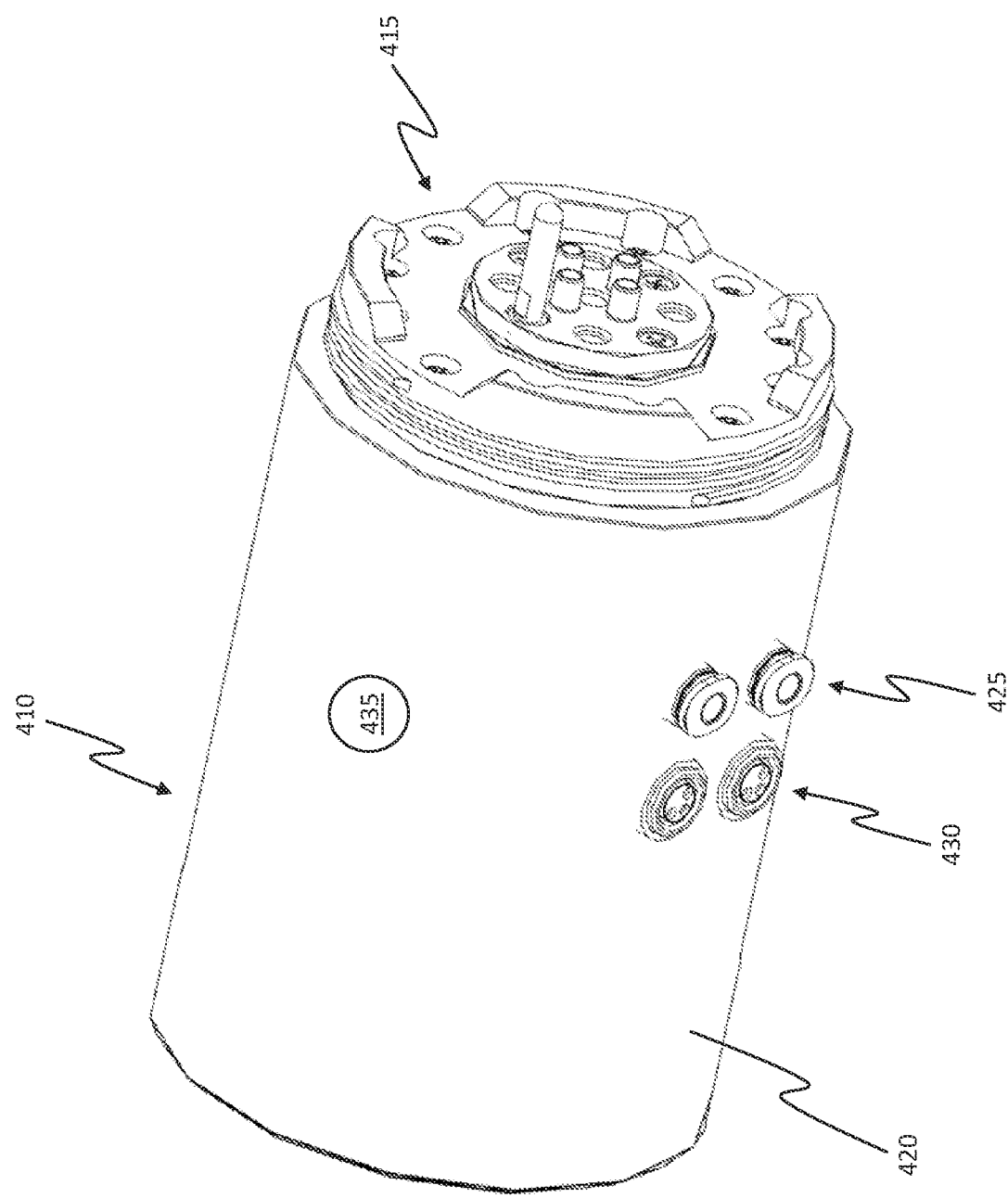
FIG. 15 shows a perspective view of an end module according to a first embodiment.

FIG. 15 shows a perspective view of an end module 410 according to a first embodiment.

Although the end module 410 shown in FIG. 15 is not installed in the industrial robot 10 shown in FIG. 1, the industrial robot 10 shown in FIG. 1 is only an exemplary embodiment. Thus, in another embodiment of the industrial robot 10, the end module 410 shown in FIG. 15 may be installed.

The end module 410 is essentially identical to the first embodiment of the passive arm module 30 explained in FIG. 9. In the following, only the differences between the end module 410 shown in FIG. 15 and the first embodiment of the passive arm module shown in FIG. 9 will be discussed.

The end module 410 comprises an end connection side 415 instead of the third and fourth connection sides. The end connection side 415 may be complementary, preferably corresponding, to the first and/or second and/or third and/or fourth connection sides. Like the connection side(s), the end connection side 415 provides both a mechanical and an electrical, data, preferably optical, and fluidic connection to the active arm module or passive arm module connectable to the end module 410.

The end connection side 415 is arranged perpendicular to the longitudinal axis. The end module 410 further comprises an end housing 420, wherein the end housing 420 is exemplarily cup-shaped. The end connection side 415 is connected to the end housing 420 in a torque-proof manner. By correspondingly configuring the end connection side 415 to at least one of the first connection side and/or the second connection side and/or the third connection side and/or the fourth connection side, the end connection side 415 may be connected to the passive arm module or the active arm module.

Opposite to a face portion of the end connection side 415, or circumferentially as shown in FIG. 15, the end module 410 may comprise a fourth fluid contact device 425, a fourth power contact device 430 also generally referred to as a further power contact device 430, and a fourth contact device 435. For example, the end connection side 415 may be embodied identically to the first connection side. The fourth fluid contact device 425 is fluidically connected to the first fluid contact device of the end connection side 415, e.g. by a fluidic line, in particular a tube. In this case, the tube is arranged in an end housing interior of the end housing 420. Likewise, a fourth optical waveguide may be arranged in the end housing interior for optically connecting the first contact device to the fourth contact device 435. An optical data signal is provided at the fourth contact device 435. As a result, a data signal configured as a control signal may be fed into the robot arm 15 via the end module 410. The fourth contact device 435 may also be additionally or alternatively configured as an output. The further converter may also be embodied as an analog-to-digital converter.

Additionally, the end module 410 may comprise a further converter, wherein the further converter is data electrically or optically connected to the fourth contact device 435 and is configured to convert a data signal (optical or electrical) fed in via the fourth contact device 435 for provision at the end connection side 415.

An electrical wire may also be disposed in the end housing interior for connecting the end connection side 415 to the fourth power contact device 430.

Figure 16:
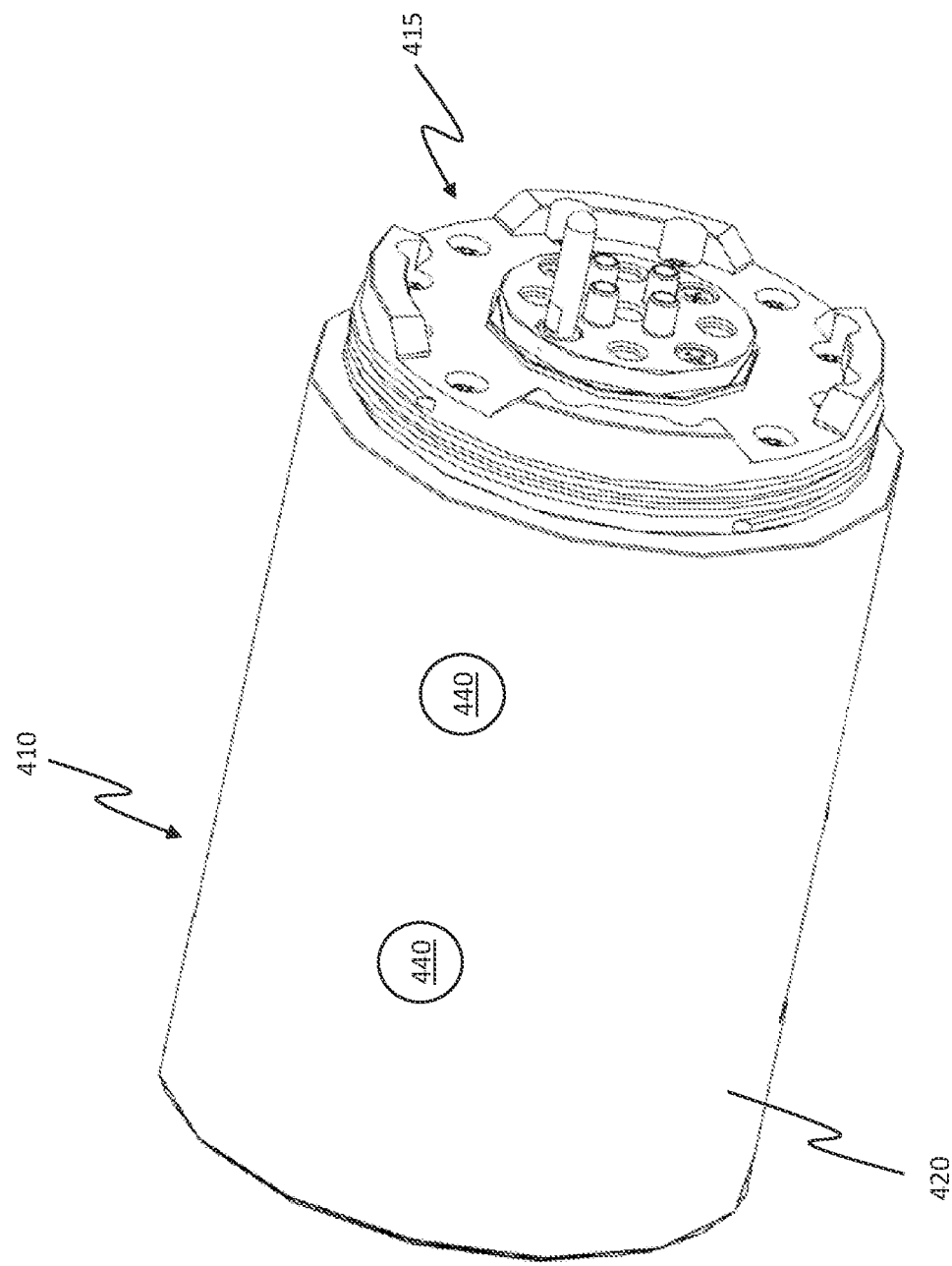
FIG. 16 shows a perspective view of an end module according to a second embodiment.

FIG. 16 shows a perspective view of an end module 410 according to a second embodiment.

The end module 410 is essentially identical to the end module 410 shown in FIG. 15, except that the fourth fluid contact device, the fourth contact device, and the fourth optical contact device shown in FIG. 15 have been omitted. Of course, the fourth fluid contact device and/or the fourth contact device and/or the fourth optical contact device may be attached to the end housing 420.

In addition, the end module 410 comprises an input unit 440. The input unit 440 may comprise one or a plurality of feelers. The input unit 440 is data-connected to the first optical contact device at the end connection side 415. Based on the input, the input unit 440 provides correlating information via the optical signal transmitted to the end connection side 415. This allows the optical signal to be passed across the end connection side 415 to the further active and/or passive arm modules and to be used to control the robot arm.

Figure 17:
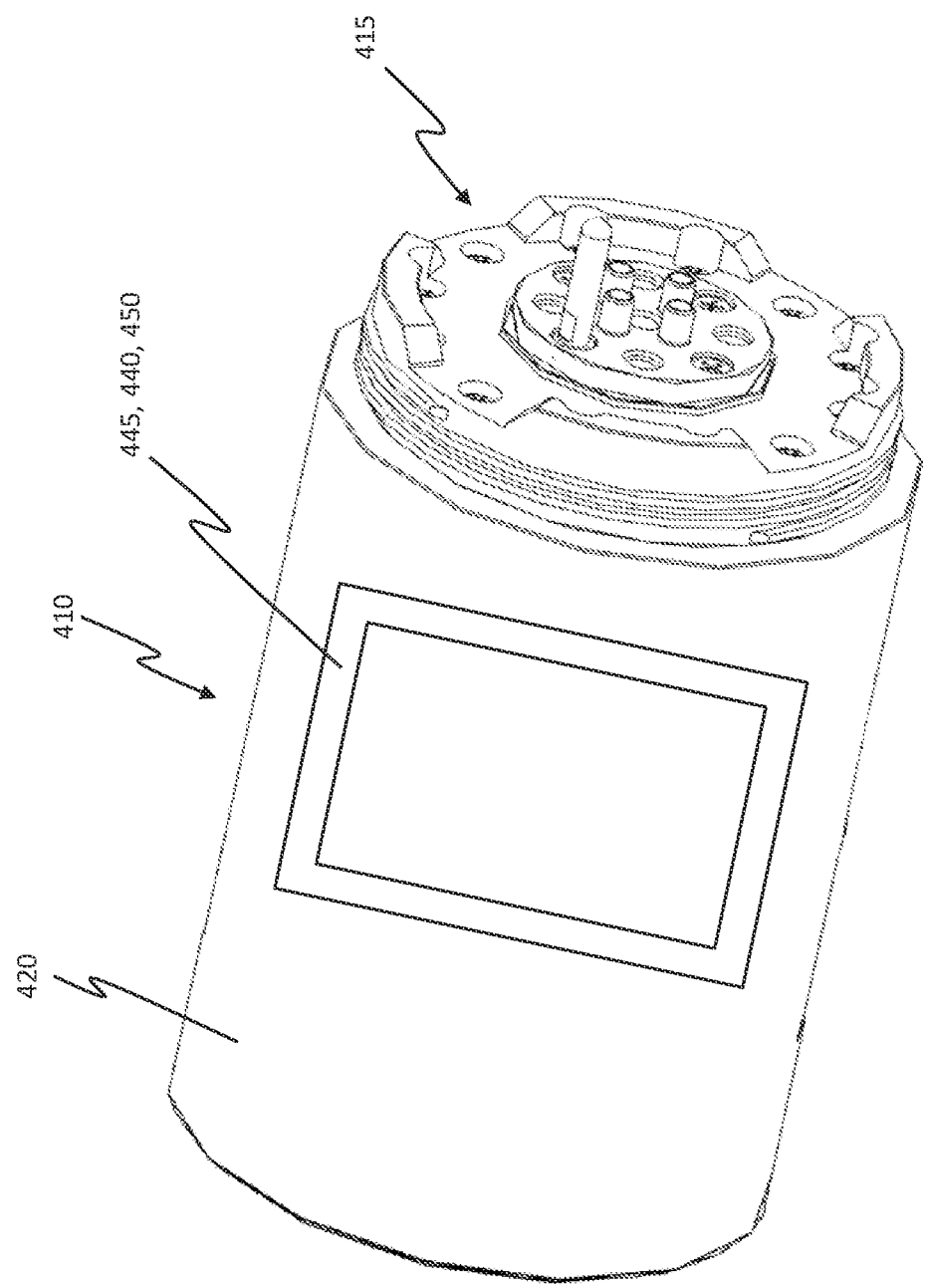
FIG. 17 shows a perspective view of an end module according to a third embodiment.

FIG. 17 shows a perspective view of an end module 410 according to a third embodiment.

The end module 410 is essentially identical to the end module 410 described in FIG. 16, however, the end module 410 additionally comprises an output unit 445, which in the embodiment is in the form of a screen. The input unit and the output unit 440, 445 may also be combined to form a touch-sensitive screen 450 (as shown in FIG. 17).

In addition, the control unit, in particular a control unit embodied as an industrial PC, may be integrated between the end connection side 415 and the touch-sensitive screen 450 in the end housing 420.

The input and output unit 440, 445, in particular the touch-sensitive screen 450, are connected to the end connection side 415 in terms of data and power and are embodied to both detect and evaluate the optical signal. The first fluid contact device of the end connection side 415 may be deactivated.

Figure 18:
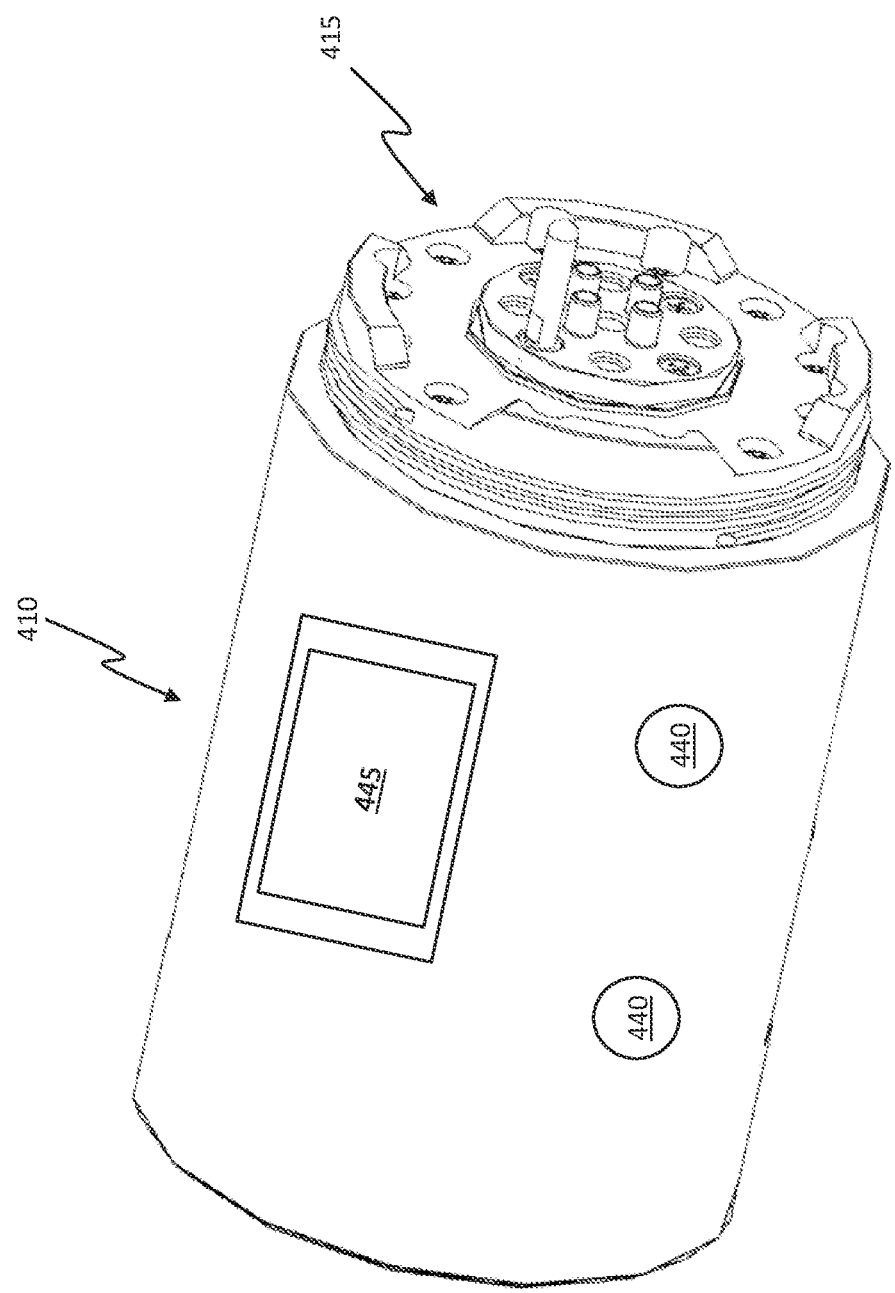
FIG. 18 shows an end module according to a fourth embodiment.

FIG. 18 shows an end module 410 according to a fourth embodiment.

The end module 410 is essentially identical to the end module 410 shown in FIG. 17. In the following, only the differences between the end module 410 shown in FIG. 18 and the end module shown in FIG. 17 are discussed. The output unit 445 is embodied as a display and the input unit 440 is embodied as a feeler, being arranged spatially adjacent to each other.

Figure 19:
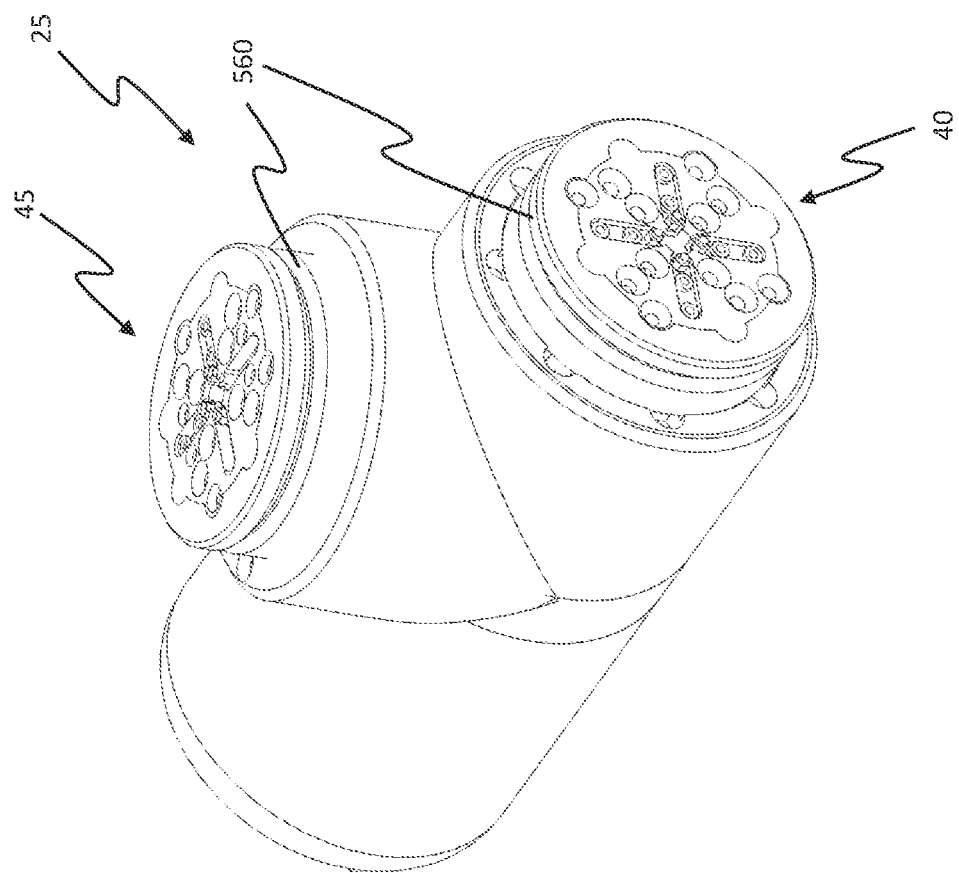
FIG. 19 shows a perspective view of an active arm module according to a third embodiment.

FIG. 19 shows a perspective view of an active arm module 25 according to a third embodiment.

The active arm module 25 is essentially embodied identically to the active arm module described in FIGS. 1 to 5. In the following, only the differences between the active arm module 25 shown in FIG. 19 and the active arm module shown in FIGS. 1 to 6 will be discussed.

The first connection side 40 and the second connection side 45 of the active arm module 25 according to the third embodiment are embodied identically. Furthermore, the external thread is omitted on the first connection side 40 and the internal thread is omitted on the second connection side 45. Instead of the thread, a circumferential groove 560 is arranged on the outer second circumferential side 105 of each of the first connection side 40 and the second connection side 45. The groove 560 may be V-shaped.

Figure 20:
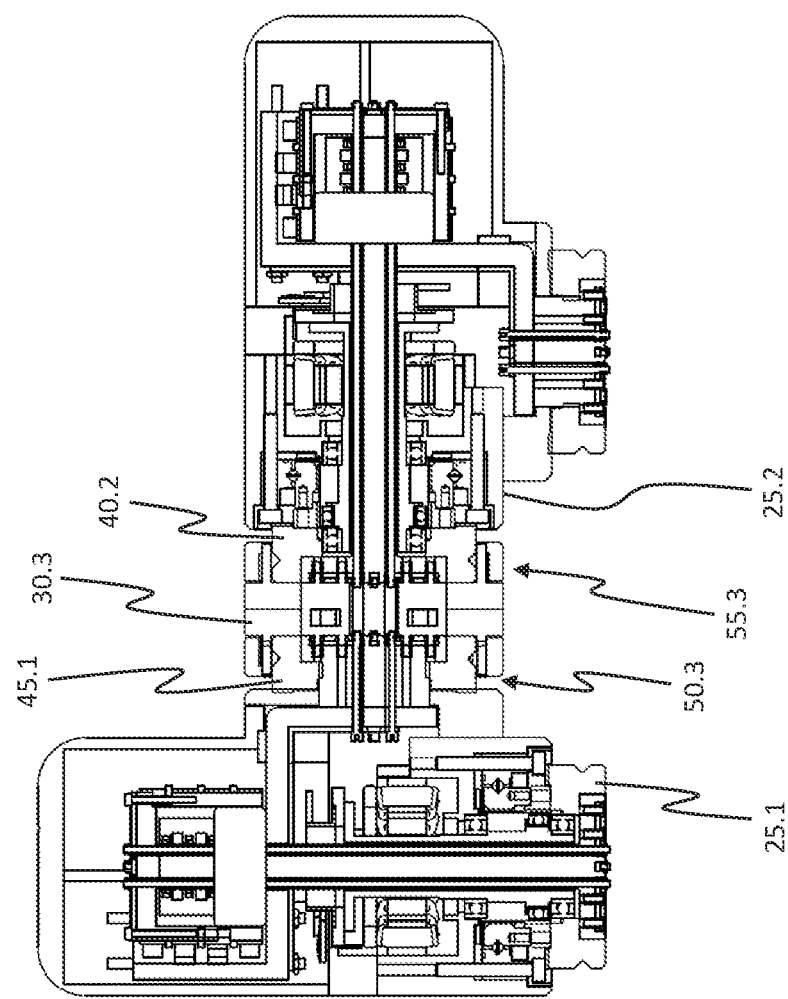
FIG. 20 shows a longitudinal section through the first active arm module and the second active arm module, each according to the third embodiment, in assembled state.

FIG. 20 shows a longitudinal section through the first active arm module 25.1 and the second active arm module 25.2, each according to the third embodiment, in an assembled state.

To connect the first active arm module 25.1 to the second active arm module 25.2, a third passive arm module 30.3 is arranged between the first active arm module 25.1 and the second active arm module 25.2, wherein the third passive arm module 30.3 comprising third and fourth connection sides 50.3 and 55.3 that are identical to one another. The third connection side 50.3 and fourth connection side 55.3 of the third passive arm module 30.3 are embodied to correspond to the first connection side 40.2 of the second active arm module 25.2 and the second connection side 45.1 of the first active arm module 25.1. The third connection side 50.3 of the third passive arm module 30.3 is connected to the second connection side 45.1 of the first active arm module 25.1, and the fourth connection side 55.3 of the third passive arm module 30.3 is connected to the first connection side 40.2 of the second active arm module 25.2. The third passive arm module 30.3 fluidically, mechanically, optically and electrically connects the first active arm module 25.1 to the second active arm module 25.2, with the third passive arm module 30.3 engaging on the outside in the groove on the first and second connection sides 40.2, 45.1 of the respective active arm modules 25.1, 25.2.

This embodiment is also suitable for modularly structuring a robot arm and for cost-effective and fast assembly and/or disassembly.

Figure 21:
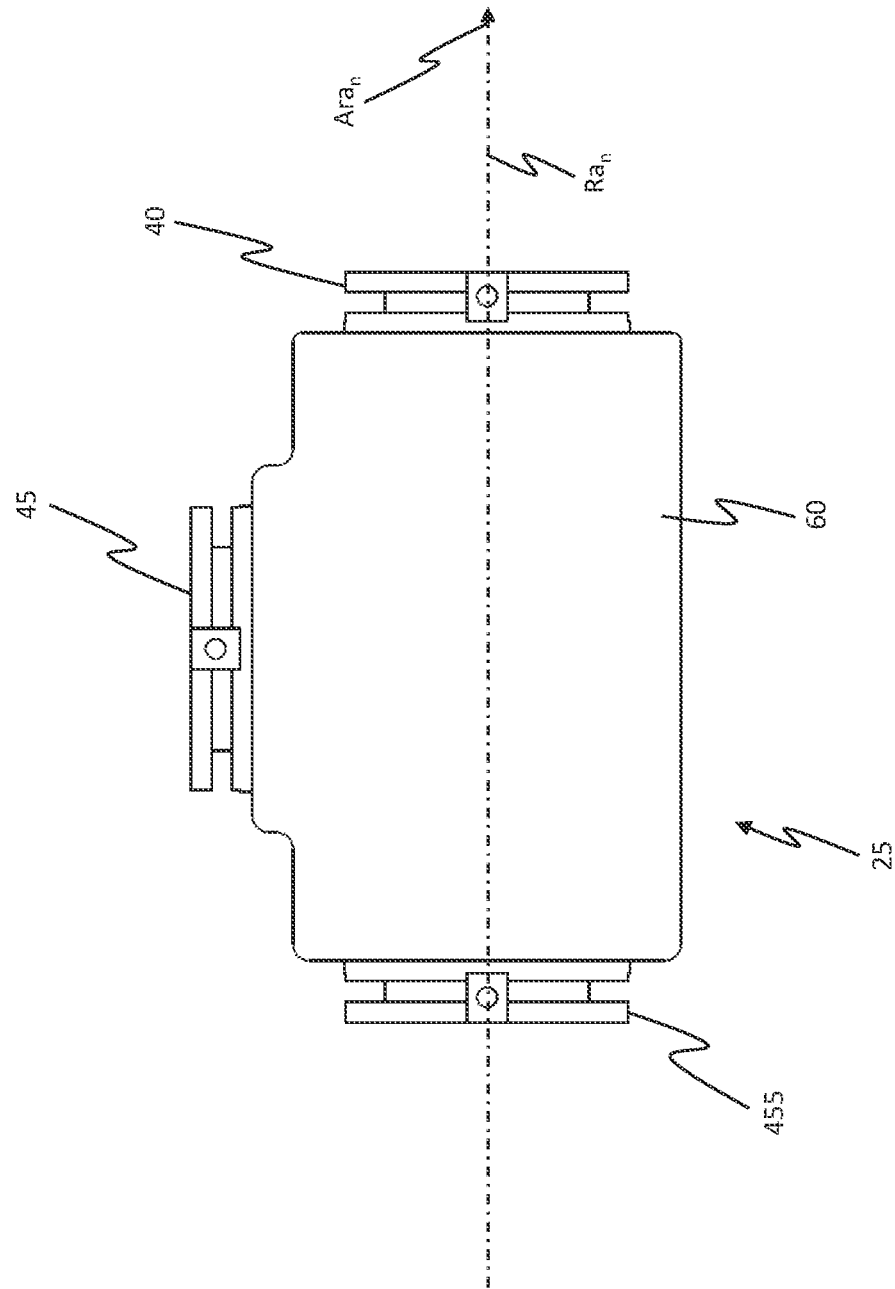
FIG. 21 shows a side view of an active arm module according to a fourth embodiment.

FIG. 21 shows a side view of an active arm module 25 according to a fourth embodiment.

The active arm module 25 shown in FIG. 21 is essentially identical to the active arm module described in FIGS. 1 to 7. In the following, only the differences between the active arm module 25 shown in FIG. 21 and the active arm module shown in FIGS. 1 to 7 will be discussed.

The active arm module 25 shown in FIG. 21 has a fifth connection side 455 in addition to the first connection side 40 and the second connection side 45, the fifth connection side 455 being identical to the second connection side 45. In the axial direction with respect to the axis of rotation $Ra_n$, the fifth connection side 455 is arranged axially opposite to the first connection side 40. As a result, in a side view, the active arm module 25 has a substantially T-shaped configuration. The fifth connection side 445 is connected to the first housing 60 in a torque-proof manner.

Figure 22:
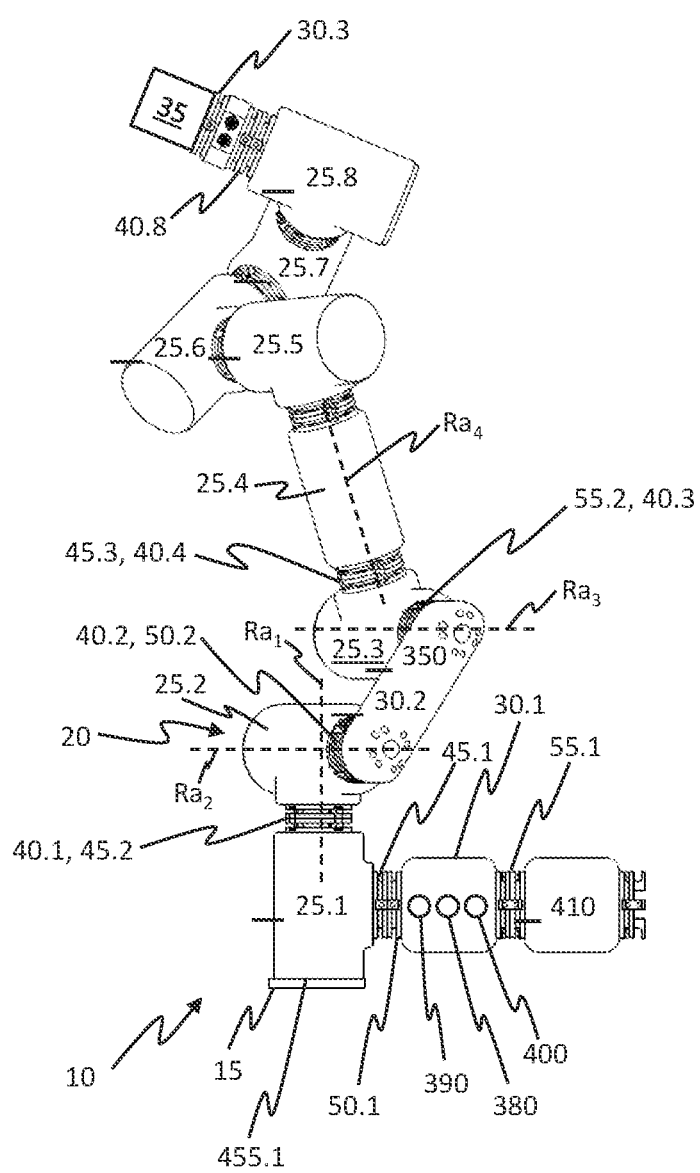
FIG. 22 shows an industrial robot according to a second embodiment.

FIG. 22 shows an industrial robot 10 according to a second embodiment.

The industrial robot 10 is essentially identical to the industrial robot 10 shown in FIG. 1, with the arm modules 25, 30 and end modules 410 described in FIGS. 2 to 21.

In this context, the first active arm module 25.1 is mechanically connected to the robot base 15 by the fifth connection side 455.1. At the second connection side 45.1, the first active arm module 25.1 is connected to a third connection side 50.1 of a first passive arm module 30.1. Laterally arranged to the first passive arm module 30.1 are the third contact device 390, the third power contact device 380, and the third fluid contact device 400. The third power contact device 380 is used to connect the industrial robot 10 to the electrical power source. The third contact device 390 is used for connection to a field-bus system or to the data network for controlling the industrial robot 10. The fluid may be fed into the industrial robot 10 via the third fluid contact device 400.

On a side facing away from the third connection side 50.1 of the first passive arm module 30.1, the fourth connection side 55.1 of the first passive arm module 30.1 is connected to an end module 410, such as described in FIGS. 17 and 18.

On the side facing away from the robot base 15, the first connection side 40.1 of the first active arm module 25.1 is connected to the second connection side 45.2 of the second active arm module 25.2. Thus, during operation of the industrial robot 10, the second active arm module 25.2 may be rotated about the first axis of rotation $Ra_1$, which is perpendicular to the robot base 15, by the first active arm module 25.1. The first connection side 40.2 of the second active arm module 25.2 is connected to the third connection side 50.2 of the second passive arm module 30.2. Opposite, the fourth connection side 55.2 of the second passive arm module 30.2 is connected to the first connection side 40.3 of the third active arm module 25.3.

Compared to FIGS. 8 to 14, the second passive arm module 30.2 is modified in that the third and fourth connection sides 50.2, 55.2 are arranged adjacent to the side and not on the face side of the end of the second housing 70, respectively.

The second connection side 45.3 of the third active arm module 25.3 is connected to the first connection side 40.4 of the fourth active arm module 25.4. The second and third active arm modules 25.2, 25.3 are embodied as J-modules. The fourth active arm module 25.4 is formed as an I-module (cf. FIG. 8) and extends essentially along a fourth axis of rotation $Ra_4$ of the fourth active arm module 25. Adjoining the fourth active arm module 25.4, fifth to eighth active arm modules 25.5, 25.6, 25.7 and 25.8 are connected to one another in series, wherein a third passive arm module 30.3 is joined to the first connection side 40.8 of the eighth active arm module 25.8, on which the end effector is arranged on the side facing away from the eighth active arm module 25.8. The third passive arm module 30.3 may e.g. be embodied as explained in FIG. 12, wherein it is embodied in such a way that a data connection, e.g. in the form of a further contact device for providing the optical signal, is additionally made available for a peripheral device via the third passive arm module 30.3.

In this embodiment, an 8-axis industrial robot 10 may be assembled in a particularly simple and cost-effective manner by combining various modules from the modular system. Also, by combining the various modules explained in FIGS. 2 to 22, both assembly and control may be carried out in a particularly simple and cost-effective manner.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE 1

List of reference numerals: 1-55

| | |
|---|---|
| 10 industrial robot | 25.7 seventh active arm module |
| 15 robot base | 25.8 eighth active arm module |
| 20 robot arm | 30 passive arm module |
| 25 active arm module | 30.1 first passive arm module |
| 25.1 first active arm module | 30.2 second passive arm module |
| 25.2 second active arm module | 30.3 third passive arm module |
| 25.3 third active arm module | 35 end effector |
| 25.4 fourth active arm module | 51 fluid |

TABLE 1-continued

List of reference numerals: 1-55

| | |
|---|---|
| 25.5 fifth active arm module | 52 electrical power source |
| 25.6 sixth active arm module | 53 data network |
| 40 first connection side | 45 second connection side |
| 40.1 first connection side of first active arm module | 45.1 second connection side of first active arm module |
| 40.2 first connection side of second active arm module | 45.2 second connection side of second active arm module |
| 40.3 first connection side of third active arm module | 45.3 second connection side of third active arm module |
| 40.4 first connection side of fourth active arm module | 45.4 second connection side of fourth active arm module |
| 40.5 first connection side of fifth active arm module | 45.5 second connection side of fifth active arm module |
| 40.6 first connection side of sixth active arm module | 45.6 second connection side of sixth active arm module |
| 40.8 first connection side of eighth active arm module | |
| 50 third connection side | 55 fourth connection side |
| 50.1 third connection side of first passive arm module | 55.1 fourth connection side of first passive arm module |
| 50.2 third connection side of second passive arm module | 55.2 fourth connection side of second passive arm module |
| 50.3 third connection side of the third passive arm module | 55.3 fourth connection side of third passive arm module |

TABLE 2

List of reference numerals: 60-296

60 first housing
65 first housing interior
70 second housing
75 second housing interior
80 first housing section
85 second housing section
90 side face
95 connection plate
100 first front face
105 second circumferential side
110 outer thread
115 first spur toothing
120 connection section
125 second front face
130 first fluid contact device
135 first power contact device
140 first power contact element
145 first contact device
150 pin
155 connecting axis
160 fastening ring
165 receptacle
170 internal thread
171 third front face
175 second spur toothing
180 recess
185 second fluid contact device
190 centering receptacle
195 second power contact device
200 second contact element
205 second contact device
206 base
210 drive device
215 drive motor
220 bearing assembly
225 gear device
230 first input side
235 second input side
240 output side
245 rotor
250 stator
260 first hollow shaft
265 first transfer device
270 first sensor device
275 second sensor device
280 first control device

TABLE 2-continued

List of reference numerals: 60-296

281 converter
285 second hollow shaft
286 first sensor
290 first signal element
291 first connection
294 second sensor
295 second signal element
296 second connection

TABLE 3

List of reference numerals: 300-460

300 encoder
305 transfer rotor
310 third connection
315 first optical waveguide
320 (optical) second transfer device
325 second optical waveguide
330 tube component
355 second housing interior
360 control device
365 second control device
370 data memory
375 interface
380 third power contact device
385 third contact element
390 third contact device
400 third fluid contact device
405 magnetic valve
410 end module
415 end connection side
420 end housing
425 fourth fluid contact device
430 fourth power contact device
435 fourth contact device
440 input unit
445 output unit
450 touch-sensitive screen
455 fifth connection side
455.1 fifth connection side of first drive module
460 groove

What is claimed is:

1. An active arm module for a robot arm of a modular industrial robot, comprising:
   a first housing,
   a first connection side,
   a second connection side arranged at an offset with regard to the first connection side, and
   a drive device;
   wherein the first connection side is rotatably mounted about an axis of rotation relative to the first housing and is connected to the drive device in a torque-locking manner,
   wherein the second connection side is connected to the first housing in a torque-proof manner,
   wherein the drive device is arranged in the first housing and is configured to controllably rotate the first connection side relative to the first housing about the axis of rotation,
   wherein a further module of the robot arm is connectable to the first and/or the second connection side, and
   wherein the first connection side is optically and/or electrically and/or power-electrically and/or fluidically connected to the second connection side and an optical signal and/or electrical signal and/or electrical power and/or a fluid is exchangeable with the further module via the first connection side and/or via the second connection side,
   wherein the drive device comprises a stator and a rotor,
   wherein the drive device comprises a gear device which, relative to the axis of rotation, is axially arranged between the rotor and the first connection side and at least comprises a first input side and an output side,
   wherein the drive device further comprises a hollow shaft, a second hollow shaft, and a bearing assembly, wherein the first hollow shaft and the second hollow shaft are rotatably supported about the axis of rotation by the bearing assembly, wherein the first hollow shaft receives the second hollow shaft and the bearing assembly rotatably supports the first hollow shaft relative to the second hollow shaft, wherein the first hollow shaft connects the rotor to the first input side of the gear device in a torque-proof manner, wherein the second hollow shaft connects the output side of the gear device to the first connection side,
   wherein a transfer device is arranged in an axial direction on a side facing away from the first connection side, comprising an encoder connected to the first housing in a torque-proof manner and comprising a transfer rotor rotatably supported around the axis of rotation, wherein the encoder and the transfer rotor are coupled to each other electrically and fluidically, and
   wherein the second hollow shaft is axially longer than the first hollow shaft and reaches through the transfer device, wherein the transfer rotor is connected to the first connection side in a torque-proof manner by the second hollow shaft, wherein the transfer rotor is electrically connected to a first power contact device of the first connection side by the second hollow shaft and fluidically connected to a first fluid contact device of the first connection side by a fluid channel, wherein the encoder is electrically connected to a second power contact device of the second connection side and fluidically connected to a second fluid contact device of the second connection side.

2. The active arm module according to claim 1, wherein the first connection side comprises a connection plate,
   wherein the first power contact device and/or the second power contact device is connectable to an electrical power source for supplying power to the drive device,
   wherein the connection plate is configured for mechanically fastening the further module and extends in a radial plane to the axis of rotation at least in sections,
   wherein the connection plate is rotatably supported about the axis of rotation and the first power contact device is mechanically attached to the connection plate,
   wherein the first power contact device is electrically connected to the second power contact device for transmitting electrical power, and
   wherein preferably the first power contact device and the second power contact device are configured corresponding to each other and/or arranged at the first and second connection sides.

3. The active arm module according to claim 1, wherein the first connection side and the second connection side are each arranged in radial planes offset from each other in the axial direction with respect to the axis of rotation.

4. The active arm module according to claim 1,
   wherein the second connection side is arranged obliquely inclined or running in parallel to the axis of rotation; and/or
   wherein the first housing is T-shaped or I-shaped or J-shaped or L-shaped, and
   wherein the first connection side is arranged at one end of the first housing and the second connection side is arranged at another end of the first housing.

5. The active arm module according to claim 1,
   wherein the drive device is arranged in axial direction adjacent to the first connection side,
   wherein the rotor is connected to the first connection side in a torque-locking manner and is mounted rotatably about the axis of rotation, and
   wherein the stator is circumferentially embraced by the first housing and is connected to the first housing in a torque-proof manner.

6. An active arm module for a robot arm of a modular industrial robot, comprising:
   a first housing,
   a first connection side,
   a second connection side arranged at an offset with regard to the first connection side, and
   a drive device;
   wherein the first connection side is rotatably mounted about an axis of rotation relative to the first housing and connected to the drive device in a torque-locking manner,
   wherein the second connection side is connected to the first housing in a torque-proof manner and oriented relative to a connection axis which is aligned perpendicular to the axis of rotation and running in a rotational plane of the axis of rotation,
   wherein the drive device is arranged in the first housing and is configured to controllably rotate the first connection side relative to the first housing about the axis of rotation,
   wherein a further module of the robot arm is connectable to the first and/or the second connection side,
   wherein the first housing is configured for fluidic, electrical and data-based connection of the first connection side to the second connection side which optically and/or electrically and/or power-electrically and/or fluidically connect the first connection side to the second connection side, so that an optical signal and/or electrical signal and/or electrical power and/or a fluid is exchangeable with the further module via the first connection side and/or via the second connection side, wherein the drive device is arranged adjacent to the first connection side in the axial direction, wherein the drive device comprises a stator and a rotor, wherein the rotor is torque-locked with the first connection side and supported about the axis of rotation in a rotatable manner, wherein the stator is circumferentially connected to the first housing in a torque-proof manner, wherein the drive device comprises a gear device which, relative to the axis of rotation, is axially arranged between the rotor and the first connection side and at least comprises a first input side and an output side, wherein the first input side is connected to the rotor and the output side is connected to the first connection side, each in a torque-proof manner, wherein the gear device is configured to reduce an input speed on the first input side to an output speed on the output side, wherein the drive device comprises a first hollow shaft, a second hollow shaft, and a bearing assembly, wherein the first hollow shaft and the second hollow shaft are rotatably supported about the axis of rotation by the bearing assembly, wherein the first hollow shaft receives the second hollow shaft and the bearing assembly rotatably supports the first hollow shaft relative to the second hollow shaft, wherein the first hollow shaft connects the rotor to the first input side of the gear device in a torque-proof manner, wherein the second hollow shaft connects the output side of the gear device to the first connection side, wherein a transfer device is arranged in an axial direction on a side facing away from the first connection side, comprising an encoder connected to the first housing in a torque-proof manner and comprising a transfer rotor rotatably supported around the axis of rotation, wherein the encoder and the transfer rotor are coupled to each other electrically and fluidically, and wherein the second hollow shaft is axially longer than the first hollow shaft and reaches through the transfer device, wherein the transfer rotor is connected to the first connection side in a torque-proof manner by the second hollow shaft, wherein the transfer rotor is electrically connected to a first power contact device of the first connection side by the second hollow shaft and fluidically connected to a first fluid contact device of the first connection side by a fluid channel, wherein the encoder is electrically connected to a second power contact device of the second connection side and fluidically connected to a second fluid contact device of the second connection side.

7. The active arm module according to claim 6, comprising a first control device arranged in the first housing for controlling the drive device, wherein the first connection side comprises at least one first contact device and the second connection side has a second contact device for data transmission, wherein the first contact device is data-connected to the second contact device for transmitting the electrical signal and/or the optical signal, wherein the first control device is data-connected to the first contact device and/or the second contact device, wherein the first control device is configured to control the drive device based on the optical and/or electrical signal, and wherein the first contact device and the second contact device are preferably configured corresponding to each other.

8. The active arm module according to claim 6, wherein the first connection side comprises the first fluid contact device and the second connection side comprises the second fluid contact device, wherein the first fluid contact device is fluidically connected to the second fluid contact device so that a fluid is exchangeable with the further module via the first connection side and/or via the second connection side, wherein the fluid is transmittable via the first fluid contact device and the second fluid contact device, and wherein the first fluid contact device and the second fluid contact device are preferably configured to correspond to one another and/or are arranged on the first and second connection sides.

9. The active arm module according to claim 6, wherein the first connection side comprises a connection plate, wherein the first power contact device and/or the second power contact device is connectable to an electrical power source for supplying power to the drive device, wherein the connection plate is configured for mechanically fastening a further module and extends in a radial plane to the axis of rotation at least in sections, wherein the connection plate is rotatably supported about the axis of rotation and the first power contact device is mechanically attached to the connection plate, wherein the first power contact device is electrically connected to the second power contact device for transmitting electrical power, wherein preferably the first power contact device and the second power contact device are configured corresponding to each other.

10. An industrial robot comprising at least one active arm module and at least one axis of rotation according to claim 6, and further comprising:

a robot base, and a robot arm;

wherein the robot arm has a modular structure and comprises a plurality of arm modules, wherein one of said at least one active arm module is provided for each of said at least one axis of rotation, wherein a first arm module of the robot arm is connected to the robot base, and wherein the robot base is configured to exchange a fluid and/or an optical and/or electrical signal and/or the electrical power with the first arm module.

11. The industrial robot of claim 10, having a passive arm module for combination with the active arm module, comprising:

a second housing extending along a longitudinal axis and a third connection side and a fourth connection side, each arranged on the front side at the second housing;

wherein the second housing mechanically connects the third connection side to the fourth connection side, wherein the first and/or the second connection side of one of the at least one active arm module or an end module of the robot arm is connectable to the third connection side and/or to the fourth connection side, and wherein an optical signal and/or electrical signal and/or electrical power and/or a fluid is exchangeable with the one active arm module via the third connection side and/or via the fourth connection side, and the third connection side is connected optically and/or electrically and/or power-electrically and/or fluidically to the fourth connection side.

12. The industrial robot of claim 11, wherein the third connection side and the fourth connection side are each arranged perpendicular to the longitudinal axis, and wherein the second housing is configured as a hollow body and at least one electrical line, one optical waveguide and/or one fluidic line and/or one optical waveguide is arranged on the inside of the second housing for connecting the third connection side to the fourth connection side.

13. An end module for a modular robot arm of a modular industrial robot, comprising:
  an end connection side, and
  an end housing;
  wherein the end connection side is connected to the end housing in a torque-proof manner,
  wherein the end connection side is configured to correspond to a first connection side of an active arm module or to a second connection side of the active arm module of the robot arm and is connectable to the first connection side or the second connection side; and/or
  wherein the end connection side is configured to correspond to a third and/or fourth connection side of a passive arm module and/or is connectable to the third and/or fourth connection side, and
  wherein at least one of an electrical and/or optical signal and/or fluid and/or electrical power is interchangeable with the passive arm module and/or the active arm module across the end connection side;
  wherein at least one fluid contact device is arranged at an offset with regard to the end connection side,
  wherein the fluid contact device is attached to the end housing, and
  wherein the fluid contact device is fluidically connected to the end connection side and a hydraulic fluid or compressed air is exchanged with the end connection side via the fluid contact device.

14. The end module according to claim 13, comprising:
  at least one third contact device arranged at an offset with regard to the end connection side,
  wherein the third contact device is attached to the end housing,
  wherein the third contact device is data-connected to the end connection side and the electrical and/or optical signal is exchangeable with the end connection side via the third contact device.

15. The end module according to claim 13, having an input unit arranged at an offset with regard to the end connection side and fastened to the end housing and/or an output unit having a touch-sensitive screen,
  wherein the input unit and/or the output unit having the touch-sensitive screen is connected to the end connection side and is configured to detect and/or generate the electrical and/or optical signal and to exchange the electrical and/or optical signal with the end connection side.

16. The end module according to claim 13, comprising:
  at least one power contact device arranged at an offset with regard to the end connection side,
  wherein the power contact device is attached to the end housing, and
  wherein the power contact device is electrically connected to the end connection side and electrical power is exchangeable with the end connection side across the power contact device.

* * * * *